US010250007B2

(12) United States Patent
Kawasuji

(10) Patent No.: US 10,250,007 B2
(45) Date of Patent: Apr. 2, 2019

(54) LASER APPARATUS AND METHOD FOR ADDING CHAMBER TO LASER APPARATUS

(71) Applicant: Gigaphoton Inc., Tochigi (JP)

(72) Inventor: Yasufumi Kawasuji, Oyama (JP)

(73) Assignee: Gigaphoton Inc., Tochigi (JP)

(*) Notice: Subject to any disclaimer, the term of this patent is extended or adjusted under 35 U.S.C. 154(b) by 420 days.

(21) Appl. No.: 15/146,259

(22) Filed: May 4, 2016

(65) Prior Publication Data

US 2016/0248213 A1    Aug. 25, 2016

Related U.S. Application Data

(63) Continuation of application No. PCT/JP2013/081642, filed on Nov. 25, 2013.

(51) Int. Cl.
  *H01S 3/00* (2006.01)
  *H01S 3/02* (2006.01)
  *H01S 3/23* (2006.01)
  *H05G 2/00* (2006.01)

(52) U.S. Cl.
  CPC .............. *H01S 3/02* (2013.01); *H01S 3/2308* (2013.01); *H01S 3/005* (2013.01); *H01S 3/0071* (2013.01); *H05G 2/003* (2013.01); *H05G 2/008* (2013.01)

(58) Field of Classification Search
  CPC ......... H01S 3/02; H01S 3/0071; H01S 3/2308

USPC ........................................................ 359/333
  See application file for complete search history.

(56) References Cited

U.S. PATENT DOCUMENTS

2005/0271110 A1* 12/2005 Paetzel .................... H01S 3/02
  372/65
2009/0103575 A1  4/2009  Abe et al.

FOREIGN PATENT DOCUMENTS

WO  2011/102534 A2  8/2011
WO  2012/114178 A2  8/2012
WO  2012/132675 A1  10/2012

OTHER PUBLICATIONS

International Search Report—PCT/JP2013/081642, dated Feb. 25, 2014.

* cited by examiner

*Primary Examiner* — Mark Hellner
(74) *Attorney, Agent, or Firm* — Studebaker & Brackett PC

(57) ABSTRACT

A laser apparatus of the present disclosure may include: a frame; a first amplifier positioned to the frame; a first input optical system positioned to the frame and configured to cause a pulse laser beam generated by an external device to enter the first amplifier; and a first output optical system positioned to the frame and configured to cause a pulse laser beam having exited from the first amplifier in a first direction to exit in a second direction that is different from the first direction.

14 Claims, 11 Drawing Sheets

*FIG. 10A*  *FIG. 10B*
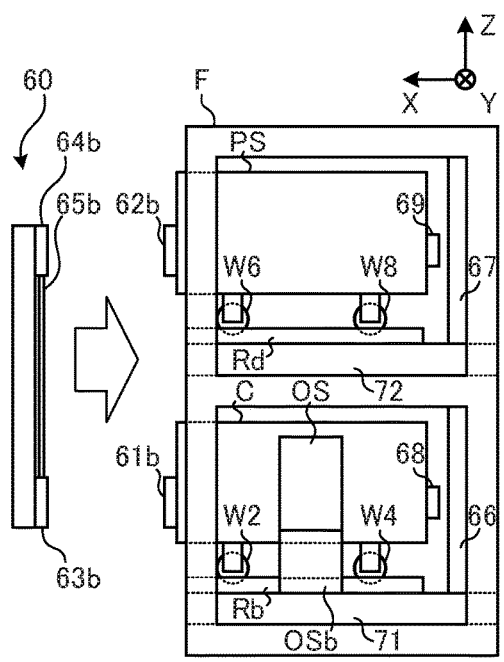
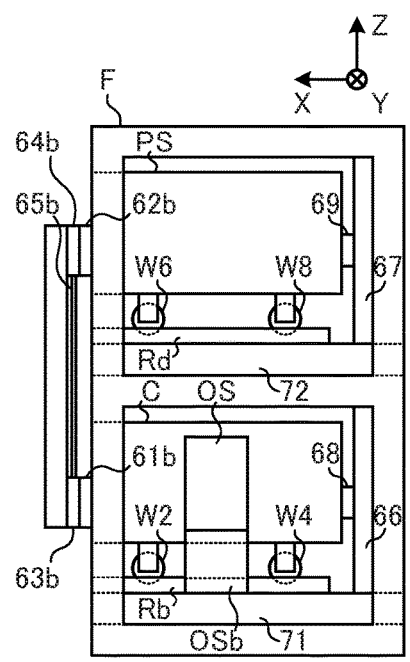

LASER APPARATUS AND METHOD FOR ADDING CHAMBER TO LASER APPARATUS

TECHNICAL FIELD

The present disclosure relates to a laser apparatus and a method for adding a chamber to a laser apparatus.

BACKGROUND ART

In recent years, as semiconductor processes become finer, transfer patterns for use in photolithographies of semiconductor processes have rapidly become finer. In the next generation, microfabrication at 70 nm to 45 nm, and further, microfabrication with 32 nm or less will be demanded. In order to meet the demand for microfabrication at 32 nm or less, for example, the development of an exposure apparatus in which an apparatus for generating extreme ultraviolet (EUV) light at a wavelength of approximately 13 nm is combined with a reduced projection reflective optics is expected.

As the apparatus for generating EUV light, three types of apparatuses have been proposed, which include a Laser Produced Plasma (LPP) type apparatus using plasma generated by irradiating a target material with a laser beam, a Discharge Produced Plasma (DPP) type apparatus using plasma generated by electric discharge, and a Synchrotron Radiation (SR) type apparatus using synchrotron radiation.

SUMMARY

A laser apparatus according to an aspect of the present disclosure may include: a frame; a first amplifier positioned to the frame; a first input optical system positioned to the frame and configured to cause a pulse laser beam generated by an external device to enter the first amplifier; and a first output optical system positioned to the frame and configured to cause a pulse laser beam having exited from the first amplifier in a first direction to exit in a second direction that is different from the first direction.

A laser apparatus according to another aspect of the present disclosure may include: a first chamber configured to allow passage of a pulse laser beam generated by an external device and cause the pulse laser beam to exit in a first direction; a third chamber configured to allow passage of a pulse laser beam having exited from the first chamber and cause the pulse laser beam to exit in the first direction; a first optical system configured to cause a pulse laser beam having exited from the third chamber to exit in a second direction that is different from the first direction; a second optical system configured to cause a pulse laser beam having exited from the first optical system to exit in a third direction that is substantially opposite to the first direction and is different from the second direction; a fourth chamber configured to allow passage of a pulse laser beam having exited from the second optical system and cause the pulse laser beam to exit in the third direction; and a second chamber configured to allow passage of a pulse laser beam having exited from the fourth chamber and cause the pulse laser beam to exit in the third direction.

A method according to another aspect of the present disclosure may be a method for adding a third chamber and a fourth chamber to a laser apparatus. The laser apparatus may include (A1) a first chamber configured to allow passage of a pulse laser beam generated by an external device and cause the pulse laser beam to exit in a first direction, (A2) a first optical system configured to cause a pulse laser beam having exited from the first chamber to exit in a second direction that is different from the first direction, (A3) a second optical system configured to cause a pulse laser beam having exited from the first optical system to exit in a third direction that is substantially opposite to the first direction and is different from the second direction, and (A4) a second chamber configured to allow passage of a pulse laser beam having exited from the second optical system and cause the pulse laser beam to exit in the third direction. The method may include: (A) changing the first optical system of the laser apparatus so that the first optical system becomes an optical system configured to cause the pulse laser beam having exited from the first chamber to exit in a first direction; (B) adding (B1) the third chamber configured to allow passage of a pulse laser beam having exited from the first optical system and cause the pulse laser beam to exit in the first direction, (B2) a third optical system configured to cause a pulse laser beam having exited from the third chamber to exit in the second direction, (B3) a fourth optical system configured to cause a pulse laser beam having exited from the third optical system to exit in the third direction, and (B4) the fourth chamber configured to allow passage of a pulse laser beam having exited from the fourth optical system and cause the pulse laser beam to exit in the third direction; and (C) changing the second optical system of the laser apparatus so that the second optical system becomes an optical system configured to cause a pulse laser beam having exited from the fourth chamber to exit in the third direction toward the second chamber.

A laser apparatus according to another aspect of the present disclosure may include: an amplifier including a plurality of first electrical connection terminals; a power supply device including a plurality of second electrical connection terminals and configured to supply electric power to the amplifier; and a frame in which the amplifier and the power supply device are placed, the frame including: a positioning mechanism configured to position the amplifier and the power supply device so that the amplifier is placed in a first position in the frame and the power supply device is placed in a second position in the frame; a plurality of third electrical connection terminals arranged to make contact with the plurality of first electrical connection terminals, respectively, when the amplifier is placed in the first position; a plurality of fourth electrical connection terminals arranged to make contact with the plurality of second electrical connection terminals, respectively, when the power supply device is placed in the second position; and a plurality of conductive members configured to be electrically connected to the plurality of third electrical connection terminals, respectively, and to the plurality of fourth electrical connection terminals, respectively.

A laser apparatus according to another aspect of the present disclosure may include: an amplifier including a plurality of first electrical connection terminals; a power supply device including a plurality of second electrical connection terminals and configured to supply electric power to the amplifier; a frame in which the amplifier and the power supply device are placed, the frame including a positioning mechanism configured to position the amplifier and the power supply device so that the amplifier is placed in a first position in the frame and the power supply device is placed in a second position in the frame; and a connecting member configured to be attached to the amplifier and to the power supply device when the amplifier is placed in the first position and the power supply device is placed in the second position, the connecting member including: a plurality of third electrical connection terminals configured to make contact with the plurality of first electrical connection terminals, respectively, when the connecting member is attached to the amplifier and the power supply device; a plurality of fourth electrical connection terminals configured to make contact with the plurality of second electrical connection terminals, respectively, when the connecting member is attached to the amplifier and the power supply device; and a plurality of conductive members configured to be electrically connected to the plurality of third electrical connection terminals, respectively, and to the plurality of fourth electrical connection terminals, respectively.

BRIEF DESCRIPTION OF DRAWINGS

Hereinafter, various embodiments of the present disclosure will be described, as mere examples, with reference to the accompanying drawings.

FIG. 10A is a front view of a laser apparatus according to a fourth example of the second embodiment of the present disclosure.

FIG. 10B is a front view of the laser apparatus according to the fourth example of the second embodiment of the present disclosure.

DESCRIPTION OF EMBODIMENTS

Figure 1:
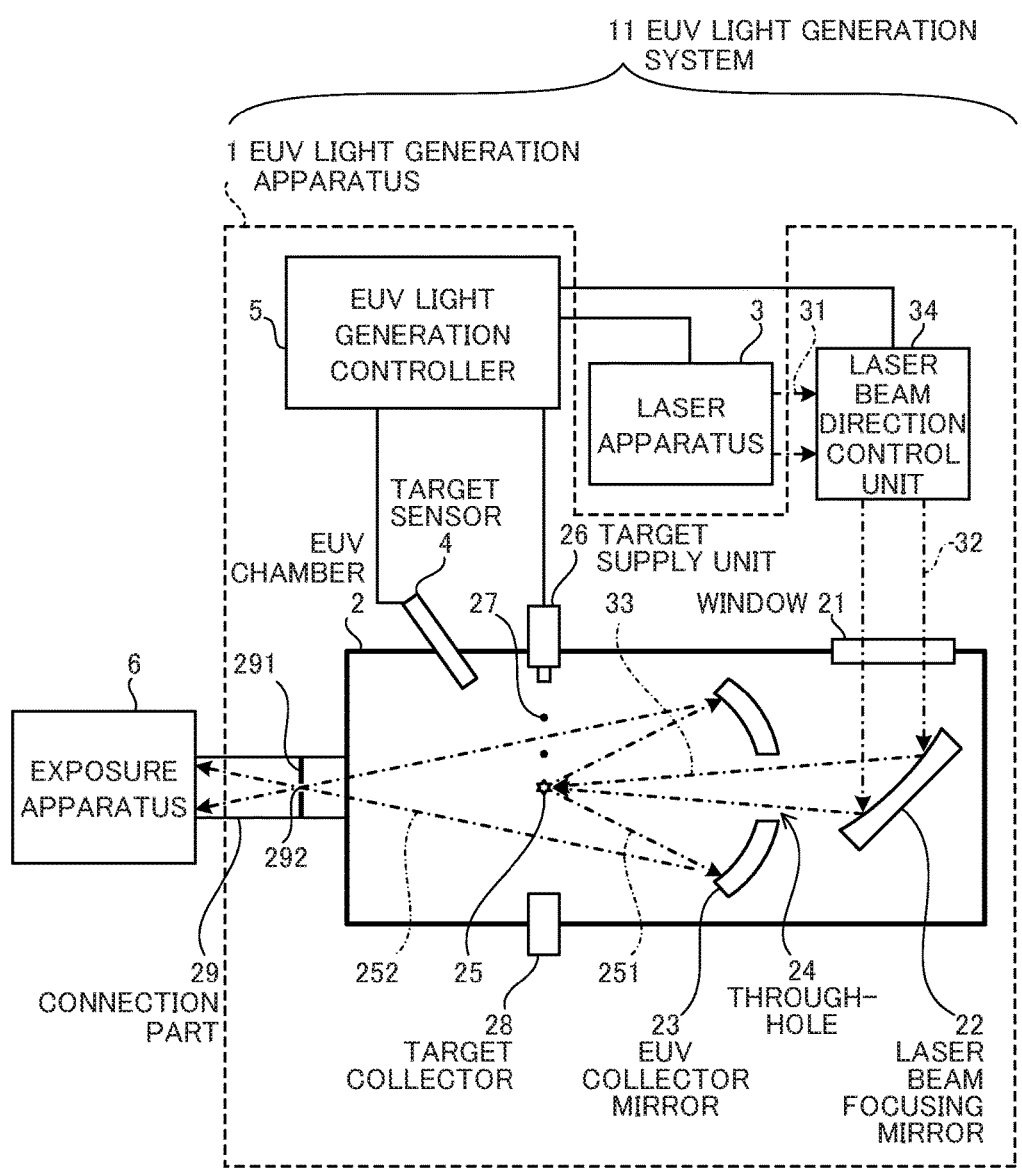
FIG. 1 schematically illustrates a configuration of an exemplary LPP type EUV light generation system.

<Contents>
1. Overview
2. Overview of EUV Light Generation System
   2.1 Configuration
   2.2 Operation
3. Laser Apparatus to Which Amplifier Can Be Added
   3.1 Overall Configuration
   3.2 Positioning to Frames
   3.3 Fixation of Frames to Each Other
   3.4 Input Optical Systems and Output Optical Systems
   3.5 Addition of Amplifiers
4. Laser Apparatus to Which Amplifier and Power Supply Device Can Be Connected
   4.1 First Example
      4.1.1 Moving Mechanisms
      4.1.2 Electrical Connection Terminals
      4.1.3 Positioning Mechanisms
   4.2 Second Example
   4.3 Third Example
      4.3.1 Positioning Mechanism
      4.3.2 Elevating Mechanisms
      4.3.3 Arrangement of Connectors
   4.4 Fourth Example
   4.5 Fifth Example
   4.6 Sixth Example
   4.7 Plurality of Electrical Connection Terminals Hereinafter, various embodiments of the present disclosure will be described in detail with reference to the drawings. The embodiments to be described below represent some examples of the present disclosure and do not limit the scope of the present disclosure. Further, the configuration(s) and operation(s) described in each embodiment are not all essential as configuration(s) and operation(s) of the present disclosure. Corresponding elements are referenced by corresponding reference symbols, and duplicate descriptions thereof will be omitted herein.

1. Overview

In an LPP type EUV light generation apparatus, a target supply unit may output a target and cause the target to reach a plasma generation region. At a point in time when the target has reached the plasma generation region, a laser apparatus irradiates the target with a pulse laser beam. This turns the target into plasma from which EUV light may be emitted.

Generation of high-output EUV light may require an increase in output of a laser apparatus configured to generate a pulse laser beam with which a target is irradiated. This makes it conceivable that a plurality of amplifiers may be arranged in series or that an additional amplifier may be provided to further increase the output of a laser apparatus having a plurality of amplifiers already installed therein. Moving the already-installed amplifiers when adding an amplifier makes it necessary to realign the already-installed amplifiers. Further, since the amplifiers and power supply devices configured to supply electric power to the amplifiers are large and heavy, it may not be easy to move or align them.

According to an aspect of the present disclosure, a laser apparatus may include (A1) a first amplifier configured to allow passage of a pulse laser beam output from an external device in a first direction and cause the pulse laser beam to exit in the first direction. Further, the laser apparatus may include (A2) a first optical system configured to cause a pulse laser beam having exited from the first amplifier to exit in a second direction that is different from the first direction. Further, the laser apparatus may include (A3) a second optical system configured to cause a pulse laser beam having exited from the first optical system to exit in a third direction that is substantially opposite to the first direction. Further, the laser apparatus may include (A4) a second amplifier configured to allow passage of a pulse laser beam having exited from the second optical system and cause the pulse laser beam to exit in the third direction.

In adding third and fourth amplifiers to this laser apparatus, the first optical system of this laser apparatus may be changed so that the first optical system becomes an optical system configured to cause the pulse laser beam having exited from the first amplifier to exit in the first direction.

Furthermore, (B1) the third amplifier configured to allow passage of the pulse laser beam having exited from the first optical system and cause the pulse laser beam to exit in the first direction may be added to this laser apparatus. Further, (B2) a third optical system configured to cause a pulse laser beam having exited from the third amplifier to exit in the second direction may be added to this laser apparatus. Further, (B3) a fourth optical system configured to cause a pulse laser beam having exited from the third optical system to exit in the third direction may be added to this laser apparatus. Further, (B4) the fourth amplifier configured to allow passage of a pulse laser beam having exited from the fourth optical system and cause the pulse laser beam to exit in the third direction may be added to this laser apparatus.

Moreover, the second optical system of this laser apparatus may be changed so that the second optical system becomes an optical system configured to cause a pulse laser having exited from the fourth amplifier to exit in the third direction toward the second amplifier.

This aspect is expected to eliminate the need to more the already-installed amplifiers when adding amplifiers. This makes it possible to reduce the need for realigning already-installed devices.

According to another aspect of the present disclosure, a laser apparatus may include: an amplifier including a plurality of first electrical connection terminals; a power supply device including a plurality of second electrical connection terminals and configured to supply electric power to the amplifier; and a frame in which the amplifier and the power supply device are placed.

In this aspect, the frame may include a positioning mechanism configured to position the amplifier and the power supply device so that the amplifier is placed in a first position in the frame and the power supply device is placed in a second position in the frame. Further, the frame may include a plurality of third electrical connection terminals arranged to make contact with the plurality of first electrical connection terminals, respectively, when the amplifier is placed in the first position. Further, the frame may include a plurality of fourth electrical connection terminals arranged to make contact with the plurality of second electrical connection terminals, respectively, when the power supply device is placed in the second position. Further, the frame may include a plurality of conductive members configured to electrically connect the plurality of third electrical connection terminals and the plurality of fourth electrical connection terminals to each other.

This aspect allows the amplifier to be electrically connected to the power supply device when the amplifier is placed in the first position in the frame and the power supply device is placed in the second position in the frame. This makes an electrical connection possible simply by placing the amplifier and the power supply device in the frame, thus making it possible to reduce difficulty in moving and aligning the amplifier and the power supply device, which are large and heavy.

2. Overview of EUV Light Generation System 2.1 Configuration

FIG. 1 schematically illustrates a configuration of an exemplary LPP type EUV light generation system. An EUV light generation apparatus 1 may be used together with at least one laser apparatus 3. In the present disclosure, a system that includes the EUV light generation apparatus 1 and the laser apparatus 3 may be referred to as an EUV light generation system 11. As shown in FIG. 1 and described in detail below, the EUV light generation apparatus 1 may include an EUV chamber 2 and a target supply unit 26. The EUV chamber 2 may be sealed airtight. The target supply unit 26 may be mounted onto the EUV chamber 2 to penetrate a wall of the EUV chamber 2. A target material to be supplied by the target supply unit 26 may include, but is not limited to, tin, terbium, gadolinium, lithium, xenon, or a combination of any two or more of them.

The EUV chamber 2 may have at least one through-hole in its wall. A window 21 may be provided on the through-hole, and a pulse laser beam 32 outputted from the laser apparatus 3 may travel through the window 21. An EUV collector mirror 23 having a spheroidal reflective surface, for example, may be provided in the EUV chamber 2. The EUV collector mirror 23 may have first and second focusing points. The EUV collector mirror 23 may have, on the surface thereof, a multi-layered reflective film in which molybdenum and silicon are alternately laminated, for example. The EUV collector mirror 23 may be preferably positioned such that the first focusing point lies in a plasma generation region 25 and the second focusing point lies in an intermediate focus (IF) region 292. If necessary, the EUV collector mirror 23 may have a through-hole 24 at the center thereof, and a pulse laser beam 33 may travel through the through-hole 24.

The EUV light generation apparatus 1 may include an EUV light generation controller 5, a target sensor 4, and the like. The target sensor 4 may have an imaging function and may be configured to detect the presence, the trajectory, the position, the speed, etc. of a target 27.

The EUV light generation apparatus 1 may further include a connection part 29 for allowing the interior of the EUV chamber 2 to be in communication with the interior of the exposure apparatus 6. A wall 291 having an aperture may be provided in the connection part 29. The wall 291 may be positioned such that the aperture is positioned at the second focusing point of the EUV collector mirror 23.

Further, the EUV light generation apparatus 1 may also include a laser beam direction control unit 34, a laser beam focusing mirror 22, a target collector 28 for collecting targets 27, and the like. The laser beam direction control unit 34 may include an optical element for defining the travel direction of a laser beam and an actuator for adjusting the position, the posture, etc, of the optical element.

2.2 Operation

With continued reference to FIG. 1, a pulse laser beam 31 outputted from the laser apparatus 3 may pass through the laser beam direction control unit 34, travel through the window 21 as the pulse laser beam 32, and enter the EUV chamber 2. The pulse laser beam 32 may travel inside the EUV chamber 2 along at least one laser beam path, be reflected by the laser beam focusing mirror 22, and strike at least one target 27 as the pulse laser beam 33.

The target supply unit 26 may be configured to output the target(s) 27 toward the plasma generation region 25 in the EUV chamber 2. The target 27 may be irradiated with at least one pulse of the pulse laser beam 33. The target 27 having been irradiated with the pulse laser beam may be turned into plasma, and radiated light 251 may be emitted from the plasma. The EUV collector mirror 23 may reflect EUV light included in the radiated light 251 with higher reflectance as compared with light of other wavelength regions. Reflected light 252 including the EUV light, which is reflected by the EUV collector mirror 23, may be focused on the intermediate focus region 292 and be outputted to the exposure apparatus 6. Here, one target 27 may be irradiated with multiple pulses included in the pulse laser beam 33.

The EUV light generation controller 5 may be configured to integrally control the whole EUV light generation system 11. The EUV light generation controller 5 may be configured to process image data of the target 27 captured by the target sensor 4, and the like. Further, the EUV light generation controller 5 may be configured to control at least one of the timing at which the target 27 is outputted and the direction in which the target 27 is outputted. Furthermore, the EUV light generation controller 5 may be configured to control at least one of the timing at which the laser system 3 oscillates, the direction in which the pulse laser beam 32 travels, and the position at which the pulse laser beam 33 is focused. The various controls mentioned above are merely examples, and other controls may be added as necessary.

3. Laser Apparatus to which Amplifier can be Added

3.1 Overall Configuration

Figure 2:
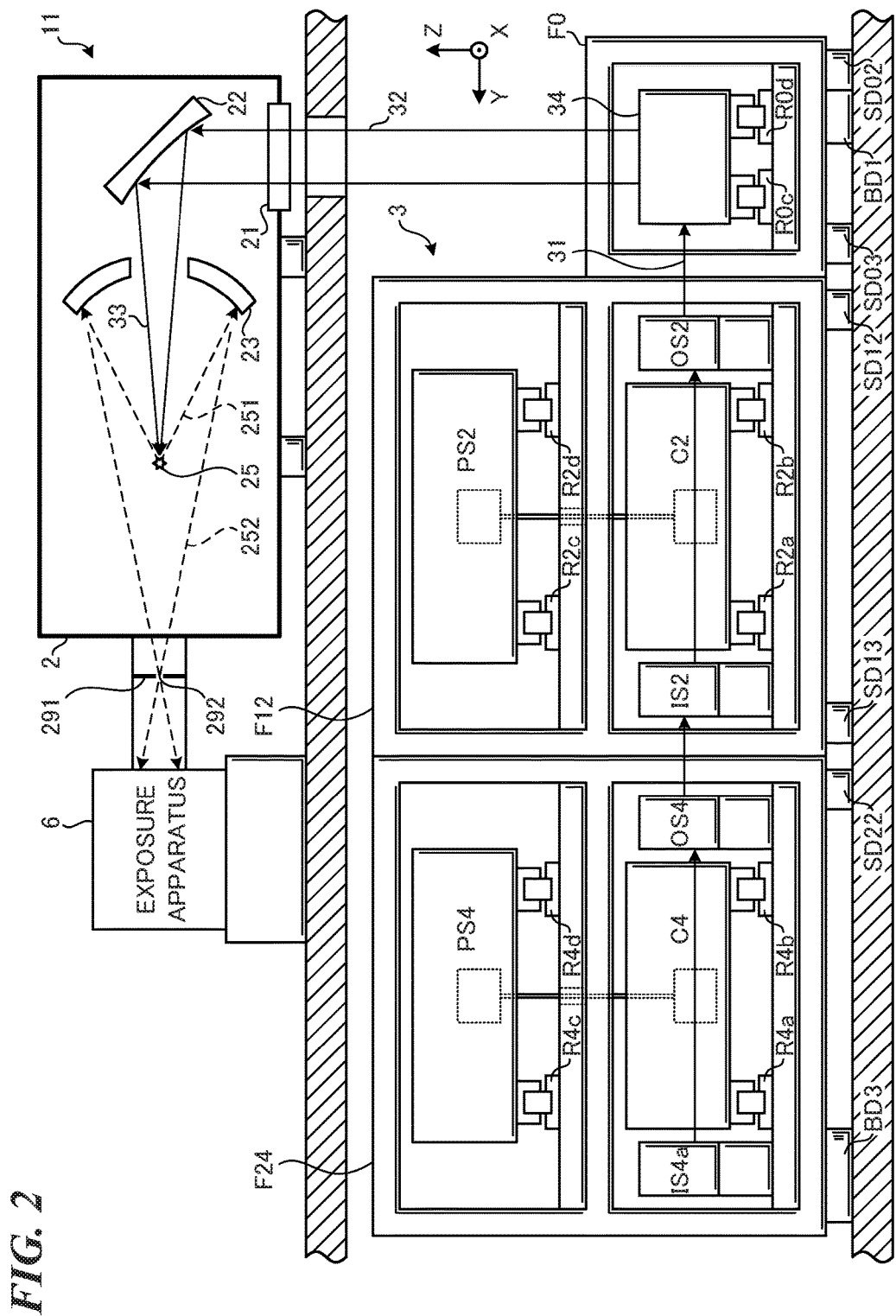
FIG. 2 is a side view of an EUV light generation system according to a first embodiment of the present disclosure.
Figure 3:
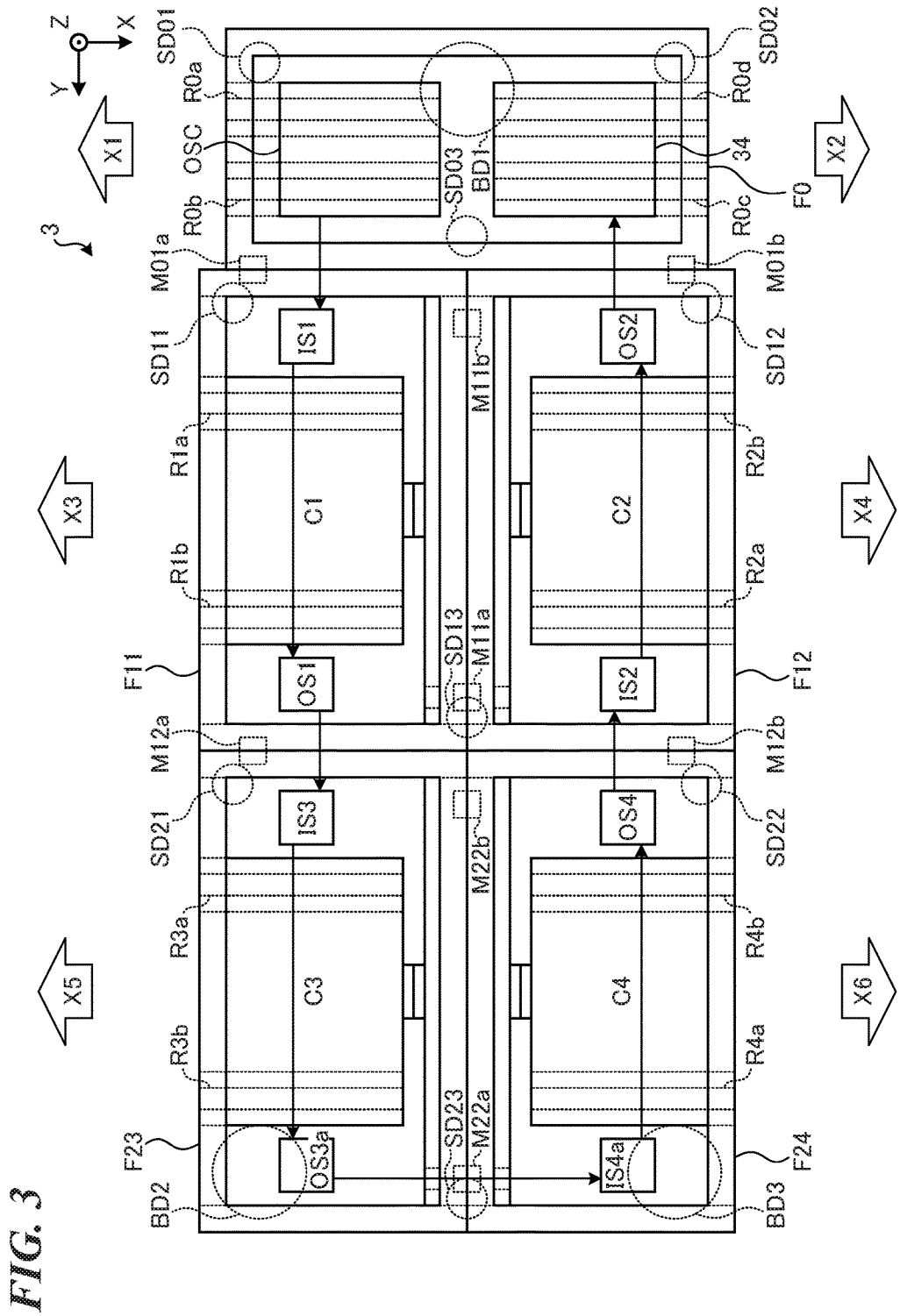
FIG. 3 is a plan view of a laser apparatus shown in FIG. 2.

FIG. 2 is a side view of an EUV light generation system 11 according to a first embodiment of the present disclosure. FIG. 2 shows cross-sections of some of the components thereof. FIG. 3 is a plan view of a laser apparatus 3 shown in FIG. 2. FIG. 3 omits to illustrate power supply devices but illustrates chambers, input optical systems, output optical systems, and the like provided below the power supply devices.

In the following description, a Z direction may be a direction that is parallel to a direction of gravitational force. A Y direction may be a first direction in which, in the laser apparatus 3, a pulse laser beam exits from an oscillator OSC toward a first input optical system IS1. An X direction may be a second direction in which, in the laser apparatus 3, the pulse laser beam exits from a third output optical system OS3a toward a fourth input optical system IS4a, A −Y direction, which is substantially opposite to the first direction, may be a third direction in which, in the laser apparatus 3, the pulse laser beam exits from the fourth input optical system IS4a toward a fourth chamber C4. The Z direction, the Y direction, and the X direction may be orthogonal to one another.

The exposure apparatus 6 and the EUV chamber 2 may be located on a second floor including a clean room. At least a part of the laser beam direction control unit 34 and the laser apparatus 3 may be located on a first floor located below the second floor.

As shown in FIG. 3, the laser apparatus 3 may include the oscillator OSC, a first chamber C1, a second chamber C2, a third chamber C3, and the fourth chamber C4. An input optical system and an output optical system may be disposed on both sides, respectively, of each of the first to fourth chambers C1 to C4 in the Y axis direction. A example configuration of the input optical systems and the output optical systems will be described later with reference to FIG. 5. Each of the input optical systems may be configured to cause a pulse laser beam to enter a corresponding chamber. Each of the output optical systems may be configured to cause a pulse laser beam having exited from the corresponding chamber to exit in a predetermined direction.

The oscillator OSC may output a pulse laser beam in the Y direction. The pulse laser beam may travel through the first input optical system IS1, the first chamber C1, the first output optical system OS1, the third input optical system IS3, the third chamber C3, and the third output optical system OS3a in this order substantially in the Y direction. The third output optical system OS3a may cause the pulse laser beam having exited from the third chamber C3 to exit in the X direction. The fourth input optical system IS4a may cause the pulse laser beam having exited from the third output optical system OS3a to exit in the −Y direction. The pulse laser beam may travel through the fourth input optical system IS4a, the fourth chamber C4, the fourth output optical system OS4, the second input optical system IS2, the second chamber C2, and the second output optical system OS2 in this order substantially in the −Y direction.

Each of the chambers may constitute an amplifier having an amplification region and amplify a pulse laser beam passing therethrough. An example of the amplifier is a three-axis orthogonal type amplifier. The three-axis orthogonal type amplifier may mean an amplifier in which the direction of flow of a laser gas serving as an amplification medium, the direction of discharge for excitation of the laser gas, and the direction in which an amplified pulse laser beam is taken out are substantially orthogonal to one another.

The second output optical system OS2 may cause the pulse laser beam to exit in the −Y direction toward the laser beam direction control unit 34. The laser beam direction control unit 34 may cause the pulse laser beam to enter the EUV chamber 2 provided on the second floor.

3.2 Positioning to Frames

At least a part of the laser beam direction control unit 34 and the oscillator OSC may be positioned to a frame F0. The oscillator OSC may be configured to be movable with respect to the frame F0 by a moving mechanism R0a and a moving mechanism R0b (see FIG. 3). In FIG. 3, the arrow X1 indicates a direction in which the oscillator OSC is taken out for maintenance. At least a part of the laser beam direction control unit 34 may be configured to be movable with respect to the frame F0 by a moving mechanism R0c and a moving mechanism R0d. In FIG. 3, the arrow X2 indicates a direction in which at least a part of the laser beam direction control unit 34 is taken out for maintenance.

The first chamber C1, the first input optical system 151, and the first output optical system OS1 may be positioned to a frame F11. The first chamber C1 may be configured to be movable with respect to the frame F11 by a moving mechanism R1a and a moving mechanism R1b. In FIG. 3, the arrow X3 indicates a direction in which the first chamber C1 is taken out for maintenance.

The second chamber C2, the second input optical system IS2, and the second output optical system OS2 may be positioned to a frame F12. The second chamber C2 may be configured to be movable with respect to the frame F12 by a moving mechanism R2a and a moving mechanism R2b. In FIG. 3, the arrow X4 indicates a direction in which the second chamber C2 is taken out for maintenance.

The third chamber C3, the third input optical system 153, and the third output optical system OS3a may be positioned to a frame F23. The third chamber C3 may be configured to be movable with respect to the frame F23 by a moving mechanism R3a and a moving mechanism R3b. In FIG. 3, the arrow X5 indicates a direction in which the third chamber C3 is taken out for maintenance.

The fourth chamber C4, the fourth input optical system IS4a, and the fourth output optical system OS4 may be positioned to a frame F24. The fourth chamber C4 may be configured to be movable with respect to the frame F24 by a moving mechanism R4a and a moving mechanism R4b. In FIG. 3, the arrow X6 indicates a direction in which the fourth chamber C4 is taken out for maintenance.

The power supply devices may be provided above the first to fourth chambers C1 to C4, respectively. FIG. 2 shows how a power supply device PS2 configured to supply electric power to the second chamber C2 is positioned to the frame F12 and a power supply device PS4 configured to supply electric power to the fourth chamber C4 is positioned to the frame F24. The power supply device PS2 may be configured to be movable with respect to the frame F12 by a moving mechanism R2c and a moving mechanism R2d. The power supply device PS4 may be configured to be movable with respect to the frame F24 by a moving mechanism R4c and a moving mechanism R4d. A power supply device (not illustrated) configured to supply electric power to the first chamber C1 and a power supply device (not illustrated) configured to supply electric power to the third chamber C3 may be provided in the same manner.

3.3 Fixation of Frames to Each Other

The frame F11, which positions the first chamber C1, and the frame F12, which positions the second chamber C2, may be configured to be separable from each other. Note, however, that the frame F11 and the frame F12 may be fixed to each other by a fixing mechanism M11a and a fixing mechanism M11b. In the present disclosure, a combination of the frames F11 and F12 fixed to each other is referred to as "first frame".

The frame F23, which positions the third chamber C3, and the frame F24, which positions the fourth chamber C4, may be configured to be separable from each other. Note, however, that the frame F23 and the frame F24 may be fixed to each other by a fixing mechanism M22a and a fixing mechanism M22b. In the present disclosure, a combination of the frames F23 and F24 fixed to each other is referred to as "second frame".

The frame F0, which positions at least a part of the laser beam direction control unit 34 and the oscillator OSC, and the first frame, which is the combination of the frames F11 and F12, may be configured to be separable from each other. Note, however, that the frame F0 and the first frame may be fixed to each other by a fixing mechanism M01a and a fixing mechanism M01b.

The first frame, which is the combination of the frames F11 and F12, and the second frame, which is the combination of the frames F23 and F24, may be configured to be separable from each other. Note, however, that the first frame and the second frame may be fixed to each other by a fixing mechanism M12a and a fixing mechanism M12b.

A plurality of small dampers SD01, SD02, and SD03 may be attached to a bottom surface of the frame F0. A plurality of small dampers SD11, SD12, and SD13 may be attached to a bottom surface of the first frame, which is the combination of the frames F11 and F12. A plurality of small dampers SD21, SD22, and SD23 may be attached to a bottom surface of the second frame, which is the combination of the frames F23 and F24.

Since the frame F0, the first frame, and the second frame are fixed to and integrated with one another, a plurality of big dampers BD1, BD2, and BD3 may be attached to the a bottom surface of the integrated frame F0, first frame, and second frame. These dampers may have a function of elastically supporting the frames and absorbing vibrations generated in the laser apparatus 3. These dampers may be constituted by air suspension devices.

Figure 4A:
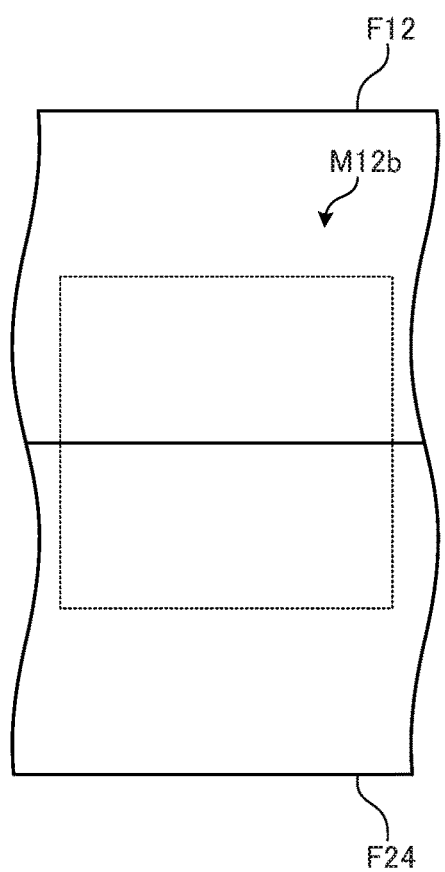
FIG. 4A is an enlarged plan view of a fixing mechanism shown in FIG. 3.
Figure 4B:
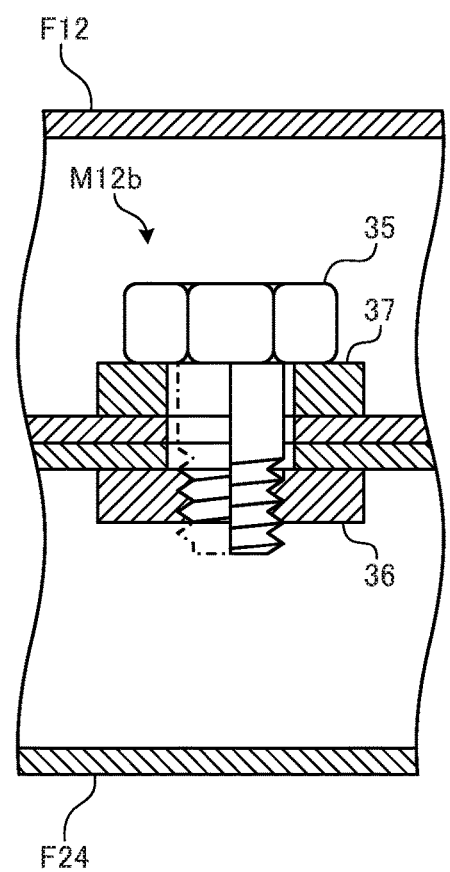
FIG. 4B is an internal perspective view of FIG. 4A and illustrates cross-sections of a part of each frame and a part of the fixing mechanism.

FIG. 4A is an enlarged plan view of the fixing mechanism M12b shown in FIG. 3. FIG. 4B is an internal perspective view of FIG. 4A and illustrates cross-sections of a part of the frame F12, a part of the frame F24, and a part of the fixing mechanism M12b. The frames F12 and F24 may include quadrangular prismatic pipes. The fixing mechanism M12b may include a bolt 35, a nut 36, and a washer 37.

The bolt 35 may penetrate through-holes formed in joint surfaces between the frames F12 and F24 from the interior of the frame F12 to the interior of the frame F24. The bolt 35 may penetrate the washer 37 in the frame F12 and be screwed into the nut 36 in the frame F24. Without being limited to the fixing mechanism M12b, the same may apply to the other fixing mechanisms M01a, M01b, M11a, M11b, M12a, M22a, and M22b. These fixing mechanisms may be provided not only in the places shown in FIG. 3 but also in other places to fix the frames to each other.

3.4 Input Optical Systems and Output Optical Systems

Figure 5:
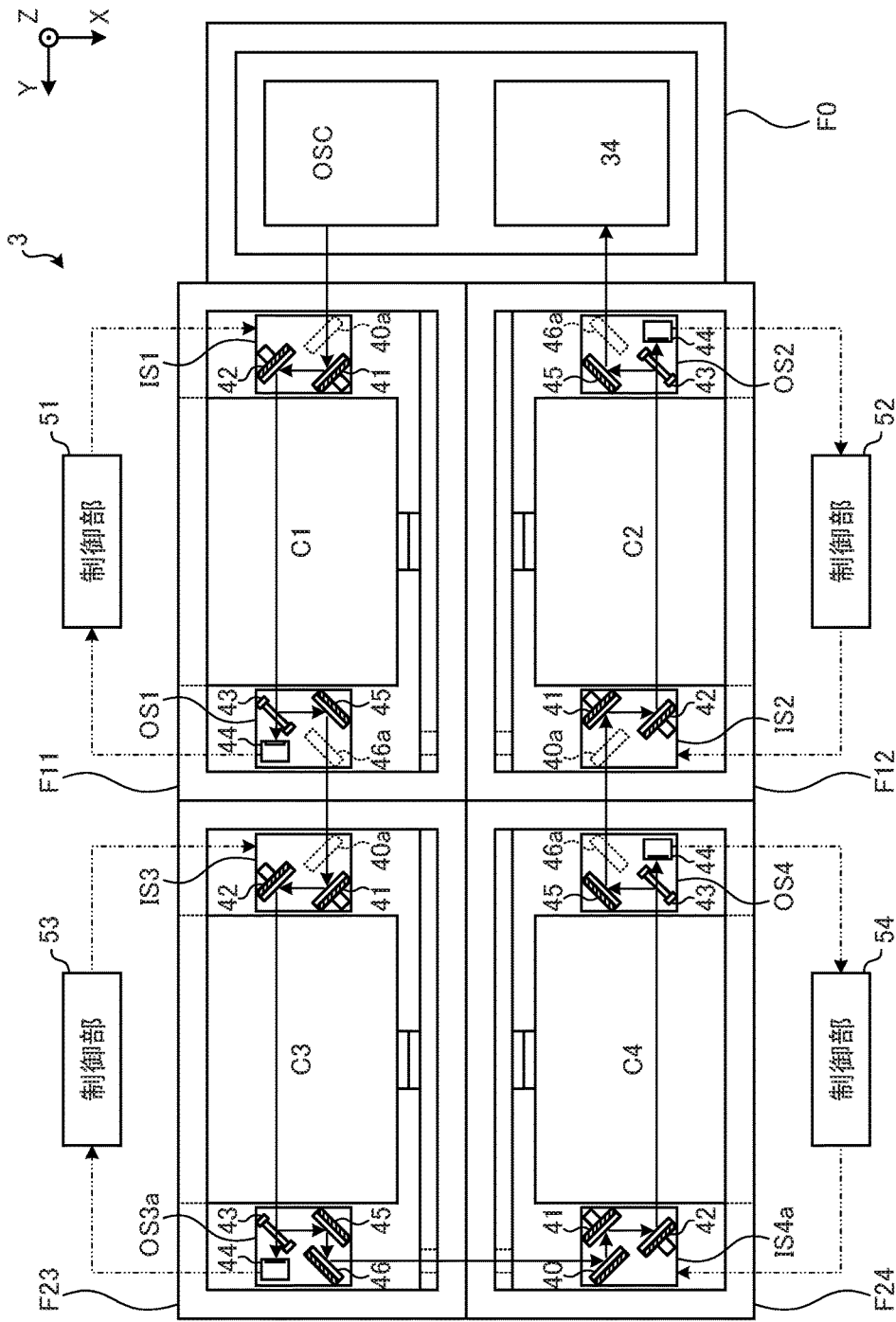
FIG. 5 is a plan view illustrating specific examples of input optical systems and output optical systems in the laser apparatus shown in FIG. 3.

FIG. 5 is a plan view illustrating specific examples of the input optical systems and the output optical systems in the laser apparatus 3 shown in FIG. 3. The first output optical system OS1 may include a beam splitter 43, an optical sensor 44, and a high-reflection mirror 45. The beam splitter 43 may reflect, with high reflectance, a part of the pulse laser beam having exited from the first chamber C1 and transmit a remaining part of the pulse laser beam. The high-reflection mirror 45 may reflect, with high reflectance, the pulse laser beam reflected with high reflectance by the beam splitter 43 and thereby cause the pulse laser beam to exit from the first output optical system C61. The travel direction of the pulse laser beam exiting by being reflected by the high-reflection mirror 45 may be parallel to the travel direction of the pulse laser beam having exited from the first chamber C1. The travel direction of the pulse laser beam may be the Y direction.

The optical sensor 44 may detect a part of the pulse laser beam transmitted by the beam splitter 43. The optical sensor 44 may, for example, detect the energy of the pulse laser beam. The optical sensor 44 may detect the position and direction of the pulse laser beam or the wavefront of the pulse laser beam in addition to or instead of detecting the energy of the pulse laser beam. The optical sensor 44 may output a detection result to a controller 51. The controller 51 may be one that is included in the EUV light generation controller 5.

The first input optical system IS1 may constitute a beam adjuster including a first adjustment mirror 41 and a second adjustment mirror 42. The first adjustment mirror 41 may reflect, with high reflectance, a pulse laser beam outputted from an external device such as the oscillator OSC. The second adjustment mirror 42 may reflect, with high reflectance, the pulse laser beam reflected by the first adjustment mirror 41 and thereby cause the pulse laser beam to enter the first chamber C1 from the first input optical system IS1. The travel direction of the pulse laser beam entering the first chamber C1 by being reflected by the second adjustment mirror 42 may be substantially parallel to the travel direction of the pulse laser beam outputted from the external device. The travel direction of the pulse laser beam may be the Y direction.

The first adjustment mirror 41 and the second adjustment mirror 42 may be provided with actuators, respectively. These actuators may be controlled by the controller 51 so that the pulse laser beams to be reflected by the respective adjustment mirrors 41, 42 may be adjusted. The first adjustment mirror 41 and the second adjustment mirror 42 may adjust the optical paths of the pulse laser beams. The first adjustment mirror 41 and the second adjustment mirror 42 may adjust the wavefronts of the pulse laser beams in addition to or instead of adjusting the optical paths of the pulse laser beams. The controller 51 may control the respective actuators of the first and second adjustment mirrors 41 and 42 on the basis of the detection result outputted from the optical sensor 44.

The second and fourth output optical systems OS2 and OS4 may be identical in configuration to the first output optical system OS1, except that the second and fourth output optical systems OS2 and OS4 are placed in an opposite orientation in the Y direction to the first output optical system OS1. As with the first output optical system OS1, the third output optical system OS3a may include a beam splitter 43, an optical sensor 44, and a high-reflection mirror 45.

The third output optical system OS3a may further include a high-reflection mirror 46. The high-reflection mirror 46 may reflect, toward the X direction, the pulse laser beam reflected in the Y direction by the high-reflection mirror 45 and thereby cause the pulse laser beam to exit from the third output optical system OS3a. The fourth input optical system IS4a may be provided in the optical path of the pulse laser beam having exited from the third output optical system OS3a. In the third output optical system OS3a, the high-reflection mirror 46 may be provided in a housing that is different from that in which the beam splitter 43, the optical sensor 44, and the high-reflection mirror 45 are provided.

The second and third input optical systems IS2 and IS3 may be identical in configuration to the first input optical system IS1, except that the second input optical system 182 is placed in an opposite orientation in the direction to the first input optical system IS1. As with the first input optical system IS1, the fourth input optical system IS4a may include a first adjustment mirror 41 and a second adjustment mirror 42.

The fourth input optical system IS4a may further include a high-reflection mirror 40. The high-reflection mirror 40 may reflect, in the −Y direction, the pulse laser beam reflected in the X direction by the high-reflection mirror 46 of the third output optical system OS3a and thereby cause the pulse laser beam to enter the first adjustment mirror 41. The fourth input optical system IS4a may direct the pulse laser beam in the −Y direction to enter the fourth chamber C4. In the fourth input optical system IS4a, the high-reflection mirror 40 may be provided in a housing that is different from that in which the first adjustment mirror 41 and the second adjustment mirror 42 are provided.

As described above, the third output optical system OS3a may be substantially identical in configuration to the first, second, and fourth output optical systems OS1, OS2, and OS4, except that the third output optical system OS3a includes the high-reflection mirror 46. The third output optical system OS3a may function as the first optical system in the present disclosure. Further, the housing accommodating the first output optical system OS1 may be identical in shape to the housing accommodating the third output optical system OS3a. That is, the housing accommodating the first output optical system OS1 may have a mirror-fixing mechanism 46a provided in a position corresponding to the position of the high-reflection mirror 46 of the third output optical system OS3a. The same may apply to the housings respectively accommodating the second and fourth output optical systems OS2 and OS4.

Further, the fourth input optical system IS4a may be substantially identical in configuration to the first, second, and third input optical systems IS1, IS2, and IS3, except that the fourth input optical system IS4a includes the high-reflection mirror 40. The fourth input optical system IS4a may function as the second optical system in the present disclosure. Further, the housing accommodating the second input optical system 12 may be identical in shape to the housing accommodating the fourth input optical system IS4a. That is, the housing accommodating the second input optical system 182 may have a mirror-fixing mechanism 40a provided in a position corresponding to the position of the high-reflection mirror 40 of the fourth input optical system IS4a. The same may apply to the housings respectively accommodating the first and third input optical systems IS1 and IS3.

Controllers 52, 53, and 54 may be similar in configuration and function to the controller 51.

3.5 Addition of Amplifiers

Figure 6A:
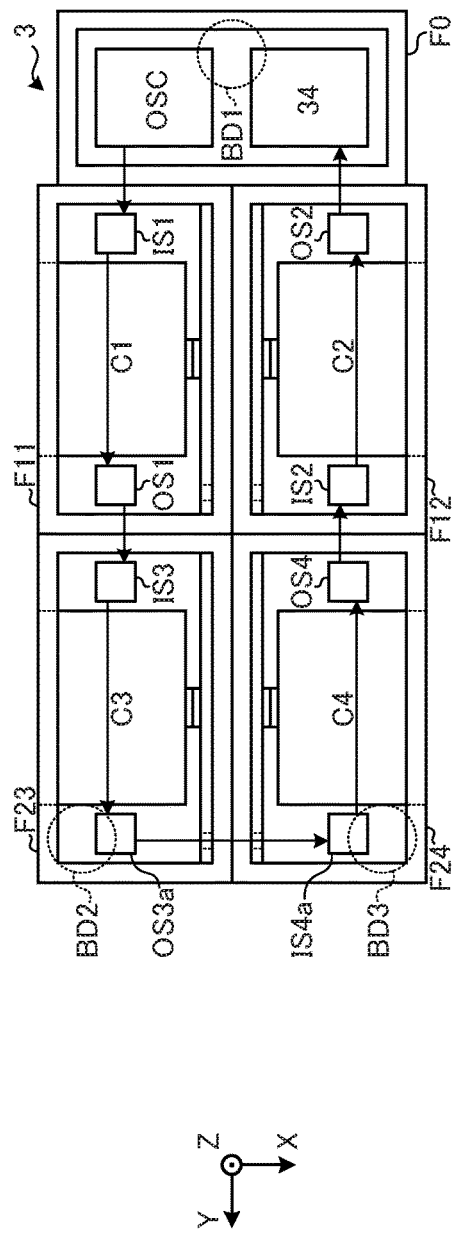
FIGS. 6A and 6B are plan views illustrating an example of addition of amplifiers to the laser apparatus shown in FIG. 3.
Figure 6B:
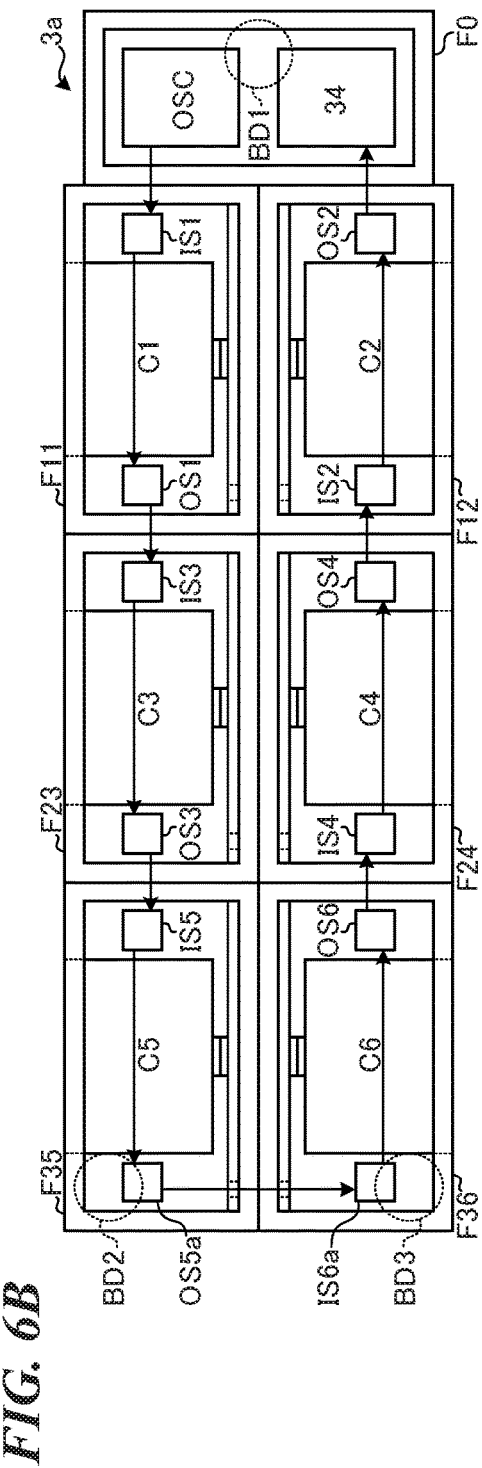

FIGS. 6A and 6B are plan views illustrating an example of addition of amplifiers to the laser apparatus 3 shown in FIG. 3. While FIG. 6A illustrates the laser apparatus 3, FIG. 6B illustrates a laser apparatus 3a obtained by adding two amplifiers to the laser apparatus 3.

The laser apparatus 3 shown in FIG. 6A and the laser apparatus 3a shown in FIG. 6B may be identical in configuration of the frames F0, F11, F12, F23, and F24 to each other. The laser apparatuses 3 and 3a may also be identical in configuration and arrangement of the oscillator OSC and the laser beam direction control unit 34 to each other. The laser apparatuses 3 and 3a may also be identical in configuration and arrangement of the first to fourth chambers C1 to C4 to each other. The laser apparatuses 3 and 3a may also be identical in configuration and arrangement of the first, second, and fourth output optical systems OS1, OS2, and OS4 to each other. The laser apparatuses 3 and 3a may also be identical in configuration and arrangement of the first, second, and third input optical systems IS1, IS2, and IS3 to each other.

In FIG. 6B, the third output optical system OS3a shown in FIG. 6A may be replaced by a third output optical system OS3 having no high-reflection mirror 46 (see FIG. 5). That is, the third output optical system OS3 shown in FIG. 63 may be identical in configuration to the first, second, and fourth output optical systems OS1, OS2, and OS4. Alternatively, the third output optical system OS3 shown in FIG. 6B may be one obtained by moving the high-reflection mirror 46 of the third output optical system OS3a shown in FIG. 6A out of the optical path of the pulse laser beam between the third chamber C3 and the fourth chamber C4. The third output optical system OS3a may function as the first optical system in the present disclosure.

In FIG. 63, the fourth input optical system IS4a shown in FIG. 6A may be replaced by a fourth input optical system IS4 having no high-reflection mirror 40 (see FIG. 5). That is, the fourth input optical system IS4 shown in FIG. 63 may be identical in configuration to the first, second, and third input optical systems IS1, IS2, and IS3. Alternatively, the fourth input optical system IS4 shown in FIG. 6B may be one obtained by moving the high-reflection mirror 40 of the fourth input optical system IS4a shown in FIG. 6A out of the optical path of the pulse laser beam between the third chamber C3 and the fourth chamber C4. The fourth input optical system IS4a may function as the second optical system in the present disclosure.

In FIG. 6B, frames F35 and F36 may be added to the configuration shown in FIG. 6A. A fifth chamber C5, a fifth input optical system IS5, a fifth output optical system OS5a, and a power supply device (not illustrated) configured to supply electric power to the fifth chamber C5 may be positioned to the frame F35. A sixth chamber C6, a sixth input optical system IS6a, a sixth output optical system OS6, and a power supply device (not illustrated) configured to supply electric power to the sixth chamber C6 may be positioned to the frame F36.

The frames F35 and F36 may be similar in configuration to the frames Fit and F12 or the frames F23 and F24. The frame F35 and the frame F36 may be fixed to each other by a fixing mechanism (not illustrated). In the present disclosure, a combination of the frames F35 and F36 fixed to each other is referred to as "third frame". A plurality of small dampers may be attached to a bottom surface of the third frame. FIGS. 6A and 6B omit to illustrate the small dampers.

The second frame, which is the combination of the frames F23 and F24, and the third frame, which is the combination of the frames F35 and F36, may be configured to be separable from each other. Note, however, that the second frame and the third frame may be fixed to each other by a fixing mechanism (not illustrated). The big dampers BD2 and BD3 shown in FIG. 6A may be moved to bottom surfaces of the frames F35 and F36, respectively, in FIG. 6B.

The fifth chamber C5 and the sixth chamber C6 may be similar in configuration to the second chamber C2 and the fourth chamber C4. It is desirable that the second chamber C2 and the fourth chamber C4 be structured to be able to withstand the energy of the pulse laser beam amplified in the first, third, fifth, and sixth chambers C1, C3, C5, and C6 in sequence.

The fifth input optical system 135 may be identical in configuration to the first, second, and third input optical systems IS1, IS2, and IS3.

The sixth output optical system OS6 may be identical in configuration to the first, second, and fourth output optical systems OS1, OS2, and OS4.

The fifth output optical system OS5a may be identical in configuration to the third output optical system OS3a shown in FIGS. 5 and 6A. That is, the fifth output optical system OS5a may be one obtained by adding a high-reflection mirror 46 (see FIG. 5) to an optical system that is identical in configuration to the first, second, fourth, or sixth output optical system OS1, OS2, OS4, or OS6. The high-reflection mirror 46 of the fifth output optical system OS5a may be one obtained by removing the high-reflection mirror 46 from the third output optical system OS3a shown in FIG. 6A or the high-reflection mirror 40 from the fourth input optical system IS4a shown in FIG. 6A and reusing the high-reflection mirror 46 or 40. The fifth output optical system OS5a may function as the third optical system in the present disclosure.

The sixth input optical system IS6a may be identical in configuration to the fourth input optical system IS4a shown in FIGS. 5 and 6A. That is, the sixth input optical system IS6a may be one obtained by adding a high-reflection mirror 40 (see FIG. 5) to an optical system that is identical in configuration to the first, second, third, or fifth input optical systems IS1, IS2, IS3, or IS5. The high-reflection mirror 40 of the sixth input optical system IS6a may be one obtained by removing the high-reflection mirror 40 from the fourth input optical system IS4a shown in FIG. 6A or the high-reflection mirror 46 from the third output optical system OS3a shown in FIG. 6A and reusing the high-reflection mirror 40 or 46. The sixth input optical system IS6a may function as the fourth optical system in the present disclosure.

The above configuration makes it possible to add the amplifiers by adding the third frame and the components to be mounted on the third frame. The configuration and arrangement of the first frame, the second frame, and the components mounted on these frames need hardly be changed, except for the two high-reflection mirrors 40 and 46. Furthermore, since the configuration and arrangement of the frame F0 and the components mounted on the frame F0 do not need to be changed, the arrangement of the EUV chamber 2 (see FIG. 2) and the like does not need to be changed, either. This makes it possible to reduce the need for realigning the already-installed devices.

In the above description, each of the first to sixth chambers C1 to C6 may constitute an amplifier, or one of the first to sixth chambers C1 to C6 does not need to be an amplifier.

Further, the configuration of the input optical systems and the output optical systems is not limited to that described above. The mode of changing the third output optical system OS3a and the fourth input optical system IS4a when adding the fifth and sixth chambers C5 and C6 is not limited to that described above, either.

Further, although a case has been described where the fifth and sixth chambers C5 and C6 are added to the laser apparatus 3 including the first to fourth chambers C1 to C4, the same may apply to a case where seventh and eighth chambers (not illustrated) are added to the laser apparatus 3a including the first to sixth chambers C1 to C6. Further, the same may apply to a case where the aforementioned laser apparatus 3 is obtained by adding the third and fourth chambers C3 and C4 to a laser apparatus (not illustrated) including the first and second chambers C1 and C2.

Further, without being limited to a case of addition, a procedure opposite to that described above may be adopted, for example in a case where the fifth and sixth chambers C5 and C6 are removed from the laser apparatus 3a including the first to sixth chambers C1 to C6.

4. Laser Apparatus to which Amplifier and Power Supply Device can be Connected

4.1 First Example

Figure 7A:
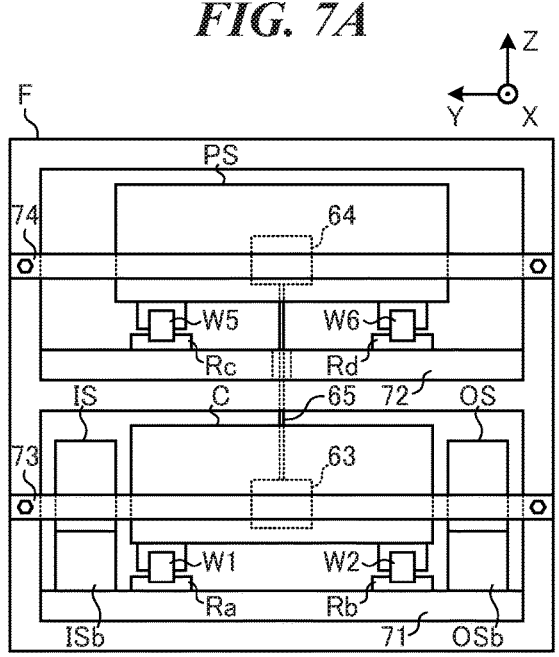
FIG. 7A is a side view of a laser apparatus according to a first example of a second embodiment of the present disclosure.
Figure 7B:
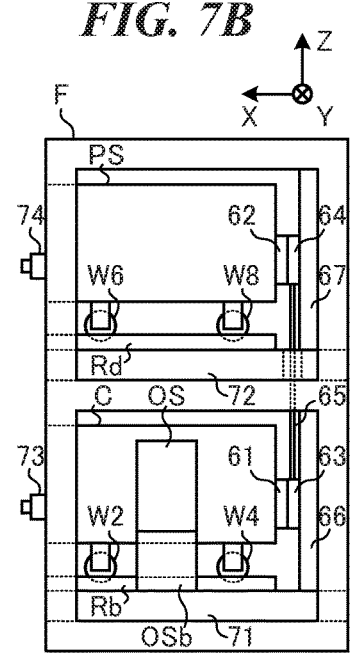
FIG. 7B is a front view of the laser apparatus shown in FIG. 7A.

FIG. 7A is a side view of a laser apparatus according to a first example of a second embodiment of the present disclosure. FIG. 7B is a front view of the laser apparatus shown in FIG. 7A. FIGS. 7A and 7B representatively illustrate a single frame F out of the plurality of frames F11, F12, F23, and F24 of the laser apparatus 3 shown in FIGS. 2 and 3. Moreover, FIGS. 7A and 7B representatively illustrate a single amplification unit including a single chamber C positioned to the single frame F, a single power supply device PS positioned to the single frame F, a single input optical system IS positioned to the single frame F, and a single output optical system OS positioned to the single frame F. As with the laser apparatus 3 shown in FIGS. 2 and 3, the laser apparatus according to the second embodiment of the present disclosure may include a plurality of the amplification units, one of which is shown in FIGS. 7A and 7B.

4.1.1 Moving Mechanisms

Shelf plates 71 and 72 may be fixed to the frame F. The chamber C may be positioned in a first position on the shelf plate 71, and moving mechanisms Ra and Rb may be provided between the chamber C and the shelf plate 71. A support unit ISb may be further provided on the shelf plate 71 so that the input optical system IS may be supported and positioned by the support unit ISb. A support unit OSb may be further provided on the shelf plate 71 so that the output optical system OS may be supported and positioned by the support unit OSb. The power supply device PS may be positioned in a second position on the shelf plate 72, and moving mechanisms Rc and Rd may be provided between the power supply device PS and the shelf plate 72.

The moving mechanisms Ra and Rb may include rails installed on the shelf plate 71 and a plurality of wheels W1, W2, and W4 provided on the chamber C. The moving mechanisms Rc and Rd may include rails installed on the shelf plate 72 and a plurality of wheels W5, W6, and W8 provided on the power supply device PS. Each of the moving mechanisms may include any number of wheels. The chamber C and the power supply device PS may be configured to be movable by the wheels moving along the rails.

Alternatively, the moving mechanisms may include wheels (not illustrated) installed on the shelf plate 71 or 72 and rails (not illustrated) provided on the chamber C or the power supply device PS. In this case, the chamber C or the power supply device PS may be configured to be movable by the wheels relatively moving along the rails.

None of the moving mechanisms Ra, Rb, Rc, and Rd may need to use rails or wheels. The moving mechanisms Ra, Rb, Rc, and Rd may allow the chamber C and the power supply device PS to be taken out from the frame F in the X direction. On the other hand, the chamber C and the power supply device PS may be installed in the frame F by being moved in the −X direction by the moving mechanisms.

4.1.2 Electrical Connection Terminals

The chamber C may include a first connector 61 on a side surface of the chamber C located at an end of the chamber C in the −X direction. The first connector 61 may include a plurality of first electrical connection terminals via which the chamber C receives electric power from the power supply device PS. The power supply device PS may include a second connector 62 on a side surface of the power supply device PS located at an end of the power supply device PS in the −X direction. The second connector 62 may include a plurality of second electrical connection terminals via which the power supply device PS supplies electric power to the chamber C.

A fixed plate 66 and a fixed plate 67 may be fixed to an end of internal space of the frame F in the −X direction.

A third connector 63 may be provided in a position on the fixed plate 66 that faces the first connector 61 of the chamber C when the chamber C is housed in the frame F. When the chamber C is placed in the first position in the frame F, the first connector 61 and the third connector 63 may be connected to each other. Moreover, when the first connector 61 and the third connector 63 are connected to each other, movement of the chamber C in the −X direction may be restricted. The third connector 63 may include a plurality of third electrical connection terminals. When the first connector 61 and the third connector 63 are connected to each other, the plurality of first electrical connection terminals may be connected to the plurality of third electrical connection terminals, respectively.

A fourth connector 64 may be provided in a position on the fixed plate 67 that faces the second connector 62 of the power supply device PS when the power supply device PS is housed in the frame F. When the power supply device PS is placed in the second position in the frame F, the second connector 62 and the fourth connector 64 may be connected to each other. Moreover, when the second connector 62 and the fourth connector 64 are connected to each other, the movement of the power supply device PS in the −X direction may be restricted. The fourth connector 64 may include a plurality of fourth electrical connection terminals. When the second connector 62 and the fourth connector 64 are connected to each other, the plurality of second electrical connection terminals may be connected to the plurality of fourth electrical connection terminals, respectively. Examples of the plurality of electrical connection terminals will be described later with reference to FIGS. 13A and 13B.

The plurality of third electrical connection terminals of the third connector 63 may be electrically connected to the plurality of fourth electrical connection terminals of the fourth connector 64, respectively, via a plurality of conductive members 65. When the first connector 61 and the third connector 63 are connected to each other and the second connector 62 and the fourth connector 64 are connected to each other, it becomes possible to supply electric power from the power supply device PS to the chamber C via the plurality of conductive members 65.

4.1.3 Positioning Mechanisms

A fixing member 73 and a fixing member 74 may be attachable to a side surface of the frame F located at an end of the frame F in the X direction.

By attaching the fixing member 73 to the frame F with a bolt with the chamber C placed in the first position, the movement of the chamber C in the X direction may be restricted. Therefore, a positioning mechanism configured to position the chamber C may be constituted by the moving mechanisms Ra and Rb, which restrict movements in directions other than a direction along the X direction, the third connector 63 fixed to the fixed plate 66, and the fixing member 73.

By attaching the fixing member 74 to the frame F with a bolt with the power supply device PS placed in the second position, the movement of the power supply device PS in the X direction may be restricted. Therefore, a positioning mechanism configured to position the power supply device PS may be constituted by the moving mechanisms Rc and Rd, which restrict movements in directions other than a direction along the X direction, the fourth connector 64 fixed to the fixed plate 67, and the fixing member 74.

4.2 Second Example

Figure 8A:
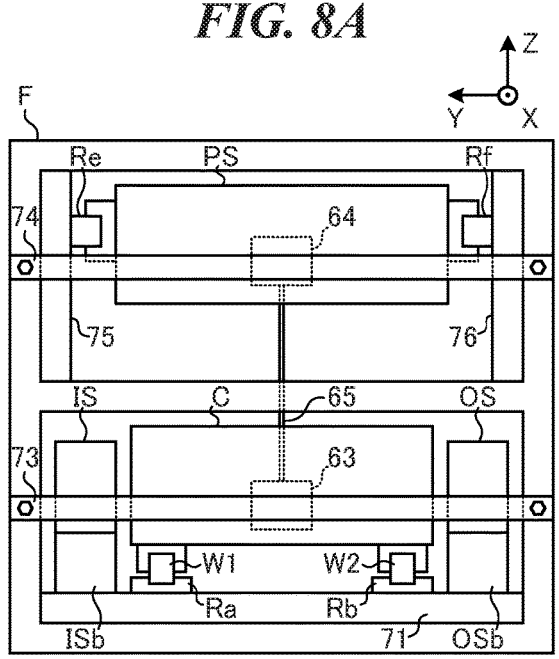
FIG. 8A is a side view of a laser apparatus according to a second example of the second embodiment of the present disclosure.
Figure 8B:
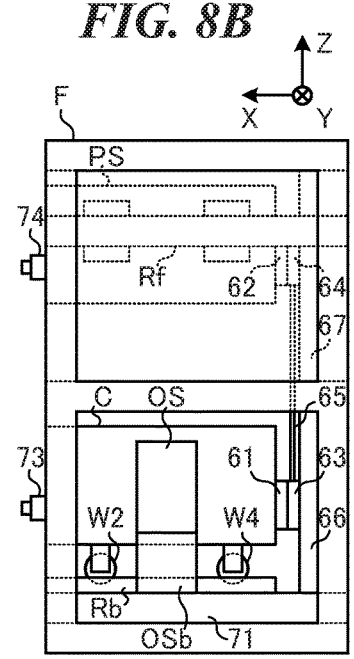
FIG. 8B is a front view of the laser apparatus shown in FIG. 8A.

FIG. 8A is a side view of a laser apparatus according to a second example of the second embodiment of the present disclosure. FIG. 8B is a front view of the laser apparatus shown in FIG. 8A. FIGS. 8A and 8B also representatively illustrate a single frame F and a single amplification unit.

In the second example, moving mechanisms Re and Rf of the power supply device PS may be different from the moving mechanisms of the first example. Further, the shelf plate 72 does not need to be provided. As shown in FIG. 8A, support plates 75 and 76 may be fixed to ends of the internal space of the frame F in the Y direction and the −Y direction, respectively. The moving mechanism Re may be supported by the support plate 75, and the moving mechanism Rf may be supported by the support plate 76. The moving mechanisms Re and Rf may support the power supply device PS at both ends of the power supply device PS in the Y direction and the −Y direction and enable the power supply device PS to move along the X axis.

In other respects, the second example may be identical to the first example.

4.3 Third Example

Figure 9A:
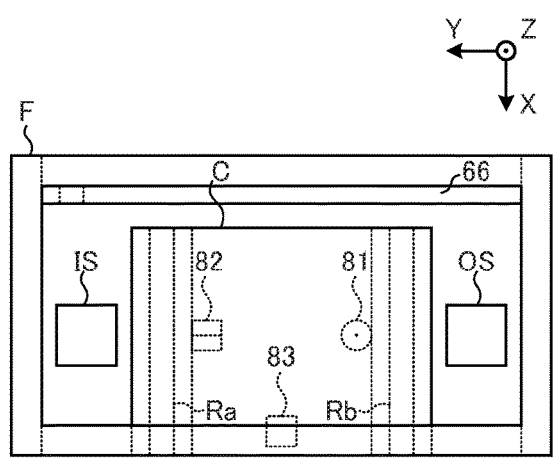
FIG. 9A is a plan view of a laser apparatus according to a third example of the second embodiment of the present disclosure.
Figure 9B:
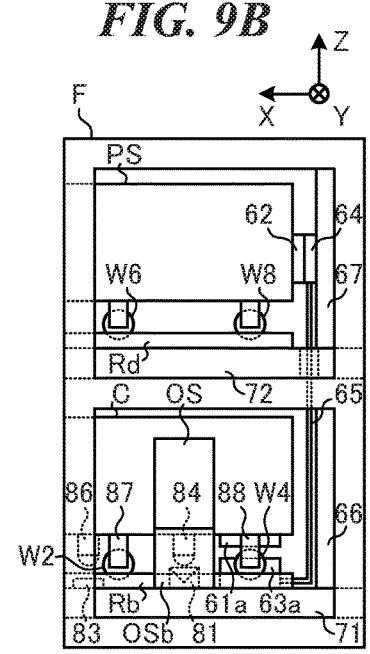
FIG. 9B is a front view of the laser apparatus shown in FIG. 9C.
Figure 9C:
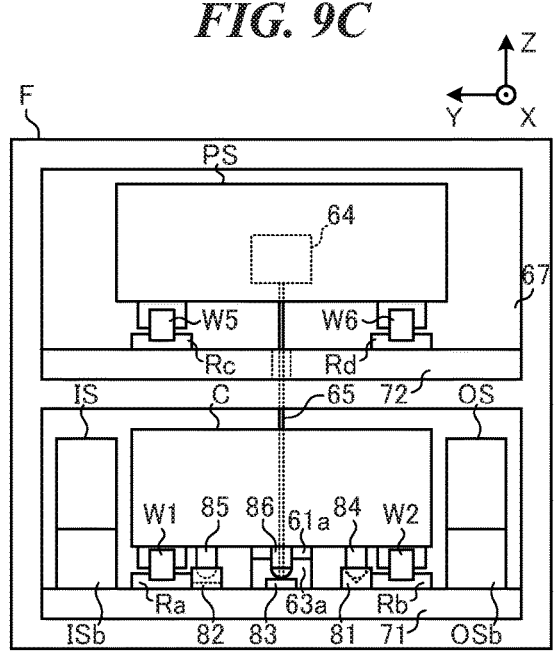
FIG. 9C is a side view of the laser apparatus according to the third example of the second embodiment of the present disclosure.
Figure 9D:
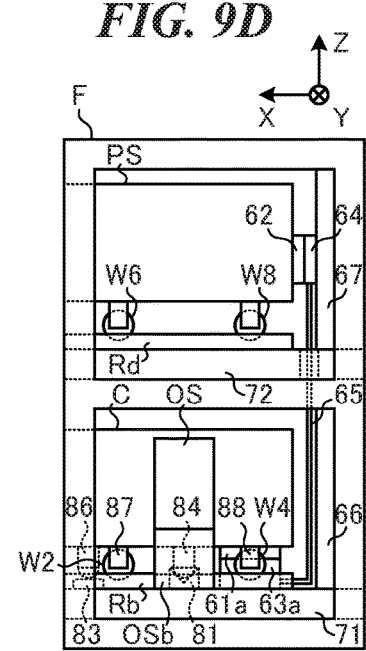
FIG. 9D is a front view of the laser apparatus shown in FIG. 9C.

FIG. 9A is a plan view of a laser apparatus according to a third example of the second embodiment of the present disclosure. FIG. 9C is a side view of the laser apparatus according to the third example of the second embodiment of the present disclosure. FIGS. 9B and 9D are front views of the laser apparatus shown in FIG. 9C. FIG. 9B shows a state in which the chamber C is about to be positioned, and FIGS. 9C and 9D show a state in which the chamber C has been positioned. FIGS. 9A to 9D also representatively illustrate a single frame F and a single amplification unit. FIG. 9A omits to illustrate the power supply device PS, its moving mechanisms, and its positioning mechanism.

In the third example, the positioning mechanism of the chamber C and the arrangement of a first connector 61a and a third connector 63a may be different from those of the first example. The third example may further include elevating mechanisms configured to move the chamber C up and down.

4.3.1 Positioning Mechanism

As shown in FIGS. 9A to 9D, a kinematic mount including first to third mounts 81 to 83 may be provided on the shelf plate 71 so as to position the chamber C. First to third legs 84 to 86 each having a semispherical lower end may be provided on a bottom surface of the chamber C.

The first mount 81 may have a conical depression in an upper surface thereof. The first mount 81 may position the first leg 84 at one point when the first leg 84 is placed on the upper surface of the first mount 81. The second mount 82 may have a groove formed in an upper surface thereof and extending along the Y direction. This groove may be in the shape of the letter V in a cross-section perpendicular to the Y direction. The second mount 82 may restrict the movement of the second leg 85 in directions other than a direction along the Y axis when the second leg 85 is placed on the upper surface of the second mount 82. The third mount 83 may have its upper surface in the shape of a plane perpendicular to the Z direction. The third mount 83 may restrict the movement of the third leg 86 in a direction along the Z axis when the third leg 86 is placed on the upper surface of the third mount 83. The kinematic mount, which includes the first to third mounts 81 to 83, may determine the position and posture of the chamber C.

4.3.2 Elevating Mechanisms

As shown in FIGS. 93 and 9D, the chamber C may include elevating mechanisms 87 and 88. The elevating mechanisms 87 and 88 may move the housing of the chamber C up and down by lengthening and shortening the distance between each of the wheels W2 and W4 and the housing of the chamber C. Such elevating mechanisms may be provided to the wheel W1 and another wheel (not illustrated), as well as to the wheels W2 and W4.

The chamber C may be moved by the moving mechanisms Ra and Rb until the first to third legs 84 to 86 reach positions above the first to third mounts 81 to 83, respectively. At this point in time, the chamber C may be positioned in the first position by being moved down by the elevating mechanisms 87 and 88.

4.3.3 Arrangement of Connectors

As shown in FIGS. 9B and 9D, the first connector 61a, which includes a plurality of first electrical connection terminals, may be provided on the bottom surface of the chamber C. Further, the third connector 63a, which includes a plurality of third electrical connection terminals, may be provided on the upper surface of the shelf plate 71. The first connector 61a and the third connector 63a may be arranged so that the first connector 61a and the third connector 63a may be connected to each other when the chamber C is positioned in the first position.

In other respects, the third example may be identical to the first example. Alternatively, in the third example, the moving mechanisms of the power supply device PS may be configured as in the second example. The power supply device PS may be positioned using a kinematic mount or using the fixing member 74 as in the first example.

4.4. Fourth Example

FIGS. 10A and 10B are front views of a laser apparatus according to a fourth example of the second embodiment of the present disclosure. FIG. 10A shows a state in which the chamber C is about to be positioned, and FIG. 10B shows a state in which the chamber C has been positioned and the chamber C and the power supply device PS are electrically connected to each other. FIGS. 10A and 10B also representatively illustrate a single frame F and a single amplification unit.

In the fourth example, a configuration for electrically connecting the chamber C and the power supply device PS to each other may be different from that of the first example. The fixed plate 66 and the fixed plate 67 do not need to be provided with the third connector 63, the fourth connector 64, or the plurality of conductive members 65.

The chamber C may include a positioning projection 68 on a side surface of the chamber C located at an end of the chamber C in the −X direction. As shown in FIG. 10B, when the positioning projection 68 makes contact with the fixed plate 66, the movement of the chamber C in the −X direction is restricted so that the chamber C may be positioned in the first position. The chamber C may include a first connector 61b on a side surface of the chamber C located at an end of the chamber C in the X direction. The first connector 61b may include a plurality of first electrical connection terminals.

The power supply device PS may include a positioning projection 69 on a side surface of the power supply device PS located at an end of the power supply device PS in the −X direction. As shown in FIG. 10B, when the positioning projection 69 makes contact with the fixed plate 67, the movement of the power supply device PS in the −X direction is restricted, so that the power supply device PS may be positioned in the second position. The power supply device PS may include a second connector 62b on a side surface of the power supply device PS located at an end of the power supply device PS in the X direction. The second connector 62b may include a plurality of second electrical connection terminals.

With the chamber C positioned in the first position and the power supply device PS positioned in the second position, a connecting member 60 shown in FIG. 10A may be attached to the chamber C and the power supply device PS with bolts (not illustrated). The connecting member 60 may include a third connector 63b including a plurality of third electrical connection terminals and a fourth connector 64b including a plurality of fourth electrical connection terminals. When the connecting member 60 is attached to the chamber C and the power supply device PS, the third connector 63b may be connected to the first connector 61b and the fourth connector 64b may be connected to the second connector 62b. The third connector 63b and the fourth connector 64b may be arranged in the connecting member 60 so as to correspond in positional relationship to the first connector 61b and the second connector 62b, respectively.

The plurality of third electrical connection terminals of the third connector 63b may be electrically connected to the plurality of fourth electrical connection terminals of the fourth connector 64b, respectively, via a plurality of conductive members 65b. This makes it possible to supply electric power from the power supply device PS to the chamber C.

In other respects, the fourth example may be identical to the first example. Alternatively, in the fourth example, the moving mechanisms of the power supply device PS may be configured as in the second example. Alternatively, in the fourth example, the positioning mechanism of the chamber C may be configured as in the third example, and an elevating mechanism may be added. Alternatively, fixing members may be provided as in the first example.

4.5 Fifth Example

Figure 11A:
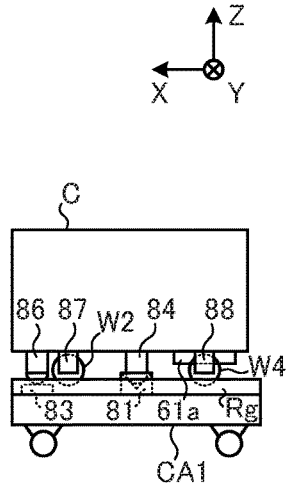
FIG. 11A to 11D are front views of a laser apparatus according to a fifth example of the second embodiment of the present disclosure.
Figure 11B:
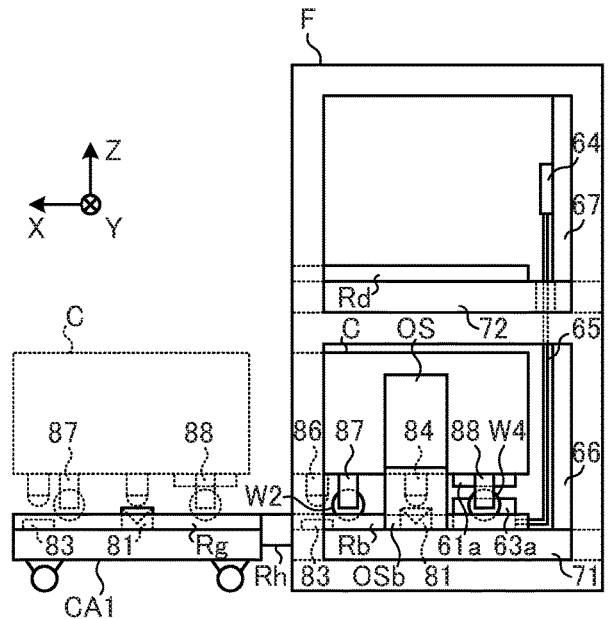
Figure 11C:
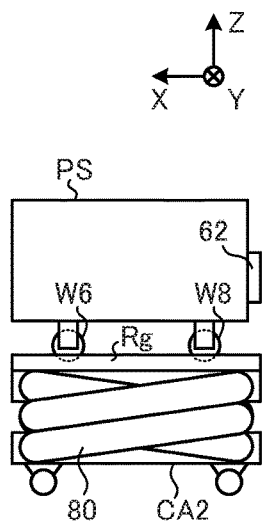
Figure 11D:
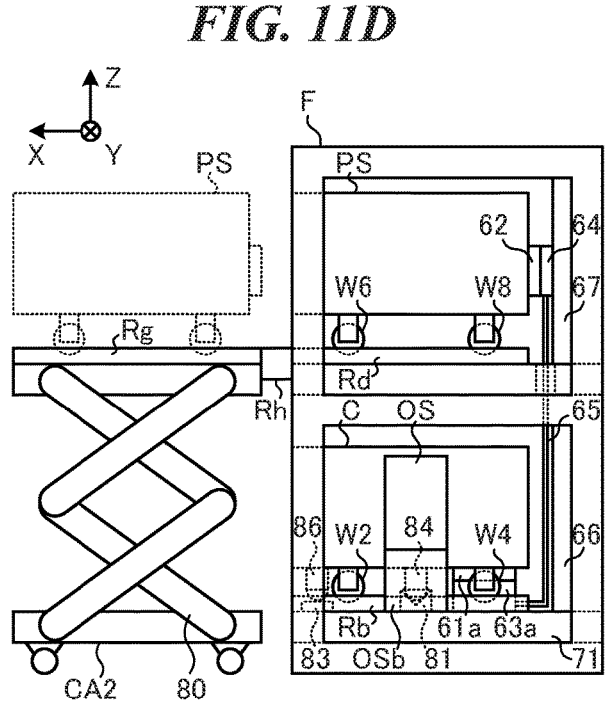

FIGS. 11A to 11D are front views of a laser apparatus according to a fifth example of the second embodiment of the present disclosure. FIG. 11A shows a state in which the chamber C is being transported to be put into the frame F. FIG. 11B shows a state in which the chamber C is put into the frame F. FIG. 11C shows a state in which the power supply device PS is being transported to be put into the frame F. FIG. 11D shows a state in which the power supply device PS is put into the frame F. FIGS. 11A to 11D also representatively illustrate a single frame F and a single amplification unit.

The fifth example shows a first method for putting the chamber C and the power supply device PS into the frame F. As shown in FIG. 11A, the chamber C may be transported by a carriage CA1. The carriage CA1 may be provided with a kinematic mount described with reference to FIGS. 9A to 9D and including first to third mounts 81 to 83. The chamber C may be positioned to the carriage CA1 by the first to third mounts 81 to 83 while being transported by the carriage CA1. Furthermore, the carriage CA1 may be provided with a moving mechanism Rg.

As shown in FIG. 11B, when the carriage CA1 with the chamber C mounted thereon has reached a side of the frame F, an operator may place a connecting mechanism Rh between the carriage CA1 and the frame F. The connecting mechanism Rh may connect the moving mechanism Rg provided on the carriage CA1 to the moving mechanism Rb provided in the frame F.

Next, the housing of the chamber C may be moved up by the elevating mechanisms 87 and 88 on the carriage CA1. This allows the chamber C to be freed from being positioned by the first to third mounts 81 to 83 and to be movable by the moving mechanism Rg.

Next, the chamber C may be moved by the moving mechanism Rg, the connecting mechanism Rh, and the moving mechanism Rb into the frame F. When the first to third legs 84 to 86 of the chamber C have reached positions in the frame F respectively above the first to third mounts 81 to 83, the housing of the chamber C may be moved down by the elevating mechanisms 87 and 88. This allows the chamber C to be positioned in the first position in the frame F and allows the first connector 61a and the third connector 63a to be connected to each other. After that, the connecting mechanism Rh may be removed, and the carriage CA1 may be withdrawn.

As shown in FIG. 11C, the power supply device PS may be transported by a carriage CA2. The carriage CA2 may include an elevating apparatus 80. Furthermore, the carriage CA2 may be provided with the moving mechanism Rg.

As shown in FIG. 11D, when the carriage CA2 with the power supply device PS mounted thereon has reached a side of the frame F, the power supply device PS mounted on the carriage CA2 may be moved up by the elevating apparatus 80 together with the moving mechanism Rg. The height of the moving mechanism Rg and the height of the moving mechanism Rd provided in the frame F may be matched to each other. Next, the operator may place the connecting mechanism Rh between the carriage CA2 and the frame F. The connecting mechanism Rh may connect the moving mechanism Rg provided on the carriage CA2 to the moving mechanism Rd provided in the frame F.

Next, the power supply device PS may be moved by the moving mechanism Rg, the connecting mechanism Rh, and the moving mechanism Rd into the frame F. This allows the power supply device PS to be placed in the second position and allows the second connector 62 and the fourth connector 64 to be connected to each other. After that, the connecting mechanism Rh may be removed, and the carriage CA2 may be withdrawn. When the power supply device PS or the chamber C is taken out from the frame F, a procedure opposite to that described above through which the power supply device PS or the chamber C was put into the frame F may be adopted.

In other respects, the fifth example may be identical to the third example. Alternatively, in the fifth example, the chamber C may be positioned as in the first example. Alternatively, in the fifth example, the moving mechanisms of the power supply device PS may be configured as in the second example. Alternatively, fixing members may be provided as in the first example. Alternatively, in the fifth example, the chamber C and the power supply device PS may be electrically connected to each other as in the fourth example.

4.6 Sixth Example

Figure 12A:
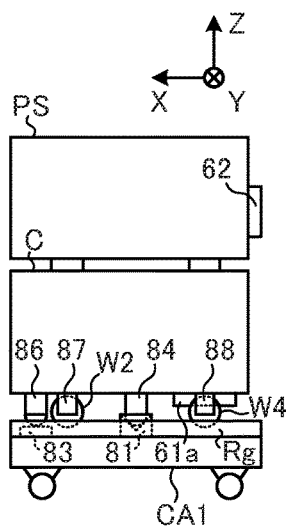
FIG. 12A is a front view of a laser apparatus according to a sixth example of the second embodiment of the present disclosure.
Figure 12B:
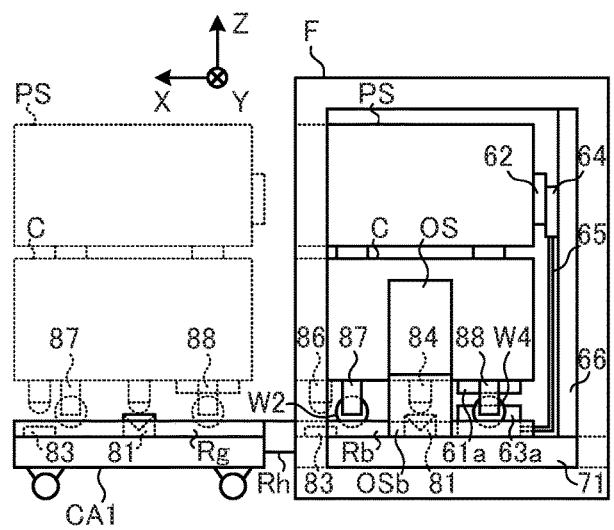
FIG. 12B is a front view of the laser apparatus according to the sixth example of the second embodiment of the present disclosure.

FIGS. 12A and 123 are front views of a laser apparatus according to a sixth example of the second embodiment of the present disclosure. FIG. 12A shows a state in which the chamber C and the power supply device PS are being transported to be put into the frame F. FIG. 123 shows a state in which the chamber C and the power supply device PS are put into the frame F. FIGS. 12A and 123 also representatively illustrate a single frame F and a single amplification unit.

The sixth example shows a second method for putting the chamber C and the power supply device PS into the frame F. As shown in FIG. 12A, the chamber C and the power supply device PS may be transported by a carriage CA1 with the power supply device PS mounted on the chamber C. The carriage CA1 may be provided with a kinematic mount described with reference to FIGS. 9A to 9D and including first to third mounts 81 to 83. Furthermore, the carriage CA1 may be provided with a moving mechanism Rg.

As shown in FIG. 123, when the carriage CA1 with the chamber C and the power supply device PS mounted thereon has reached a side of the frame F, an operator may place a connecting mechanism Rh between the carriage CA1 and the frame F. The connecting mechanism Rh may connect the moving mechanism Rg provided on the carriage CA1 to the moving mechanism Rb provided in the frame F.

Next, the housing of the chamber C and the power supply device PS may be moved up by the elevating mechanisms 87 and 88 on the carriage CA1. This allows the chamber C and the power supply device PS to be freed from being positioned by the first to third mounts 81 to 83 and to be moved by the moving mechanism Rg.

Next, the chamber C and the power supply device PS may be moved by the moving mechanism Rg, the connecting mechanism Rh, and the moving mechanism Rb into the frame F. When the first to third legs 84 to 86 of the chamber C have reached positions in the frame F respectively above the first to third mounts 81 to 83, the housing of the chamber C and the power supply device PS may be moved down by the elevating mechanisms 87 and 88.

This allows the chamber C to be placed in the first position in the frame F and allows the power supply device PS to be placed in the second position on the chamber C and in the frame F. At this point in time, the first connector 61a and the third connector 63a may be connected to each other, and the second connector 62 and the fourth connector 64 may be connected to each other. After that, the connecting mechanism Rh may be removed, and the carriage CA1 may be withdrawn. When the chamber C and the power supply device PS are taken out from the frame F, a procedure opposite to that described above through which the chamber C and the power supply device PS were put into the frame F may be adopted.

In other respects, the sixth example may be identical to the third example. Alternatively, in the sixth example, the chamber C and the power supply device PS may be electrically connected to each other as in the first or fourth example. Alternatively, the chamber C and the power supply device PS may be electrically connected directly to each other via a connector (not illustrated) provided on an upper surface of the chamber C and a connector (not illustrated) provided on a bottom surface of the power supply device PS. Further, in the sixth example, the chamber C may be positioned as in the first example. Alternatively, in the sixth example, a carriage CA2 including an elevating apparatus may be used.

4.7 Plurality of Electrical Connection Terminals

Figure 13A:
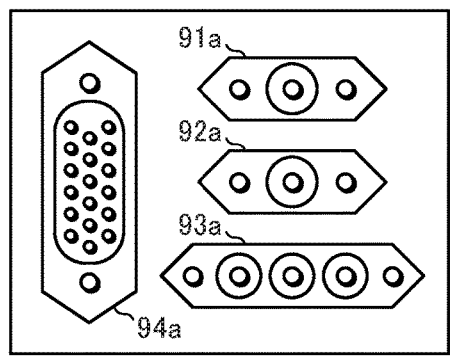
FIG. 13A illustrates an example of a plurality of electrical connection terminals.
Figure 13B:
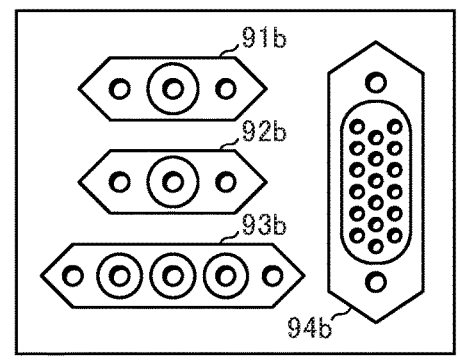
FIG. 13B illustrates an example of a plurality of electrical connection terminals.

FIGS. 13A and 13B each illustrate an example of a plurality of electrical connection terminals. The planar arrangement of the plurality of electrical connection terminals shown in FIG. 13A and the planar arrangement of the plurality of electrical connection terminals shown in FIG. 13B are bilaterally symmetrical, and have such a relationship as to face and engage with each other. If the plurality of electrical connection terminals of the first connector 61 are those shown in FIG. 13A, the plurality of electrical connection terminals of the third connector 63 are those shown in FIG. 13B. If the plurality of electrical connection terminals of the fourth connector 64 are those shown in FIG. 13A, the plurality of electrical connection terminals of the second connector 62 are those shown in FIG. 13B.

The plurality of electrical connection terminals shown in FIG. 13A may include a high-voltage connection part 91a including one high-voltage terminal, a high-voltage connection part 92a including another high-voltage terminal, a three-phase power supply connection part 93a including three terminals, and a signal line connection part 94a including a large number of signal line terminals. Positioning pins may be located at both ends, respectively, of each of the connection parts.

The plurality of electrical connection terminals shown in FIG. 13B may include a high-voltage connection part 91b including one high-voltage terminal, a high-voltage connection part 92b including another high-voltage terminal, a three-phase power supply connection part 93b including three terminals, and a signal line connection part 94b including a large number of signal line terminals. Pin holes with which the aforementioned positioning pins engage may be located at both ends, respectively, of each of the connection parts.

Further, for example, when the plurality of electrical connection terminals shown in FIG. 13A are plugs (male terminals), the plurality of electrical connection terminals shown in FIG. 13B may be sockets (female terminals). Further, even if one of the connectors has a mixture of male terminals and female terminals, the other connector needs only be configured to engage with it.

The second embodiment may lighten the work load of placing the chamber C and the power supply device PS in their respective positions and electrically connecting the chamber C and the power supply device PS to each other. This makes it possible to reduce the labor of installing the chamber C and the power supply device PS.

The above description is intended to be non-restrictive and to merely provide examples. Therefore, it will be apparent to a person skilled in the art that changes can be made to the embodiments of the present disclosure without departing from the scope of the accompanying claims.

The terms used in the entirety of this specification and the appended claims should be interpreted as "non-limiting" terms. For example, the terms "include" and "be included" should be interpreted as "including the stated elements but not limited to the stated elements." The term "have" should be interpreted as "having the stated elements but not limited to the stated elements." Further, the modifier "one (a/an)" used in this specification and the appended claims should be interpreted as "at least one" or "one or more."

The invention claimed is:
1. A laser apparatus comprising:
   a frame;
   a first amplifier positioned to the frame;
   a first input optical system positioned to the frame and configured to cause a pulse laser beam generated by an external device to enter the first amplifier;
   a first output optical system positioned to the frame and configured to cause a pulse laser beam having exited from the first amplifier in a first direction to exit in a second direction that is different from the first direction;
   a second amplifier positioned to the frame;
   a second input optical system positioned to the frame and configured to cause a pulse laser beam having exited from the first output optical system in the second direction to travel in a third direction and enter the second amplifier, the third direction being substantially opposite to the first direction and being different from the second direction; and a second output optical system positioned to the frame and configured to cause a pulse laser beam having exited from the second amplifier in the third direction to exit in the third direction.

2. A laser apparatus comprising:
a frame;
a first amplifier positioned to the frame;
a first input optical system positioned to the frame and configured to cause a pulse laser beam generated by an external device to enter the first amplifier;
a first output optical system positioned to the frame and configured to cause a pulse laser beam having exited from the first amplifier in a first direction to exit in a second direction that is different from the first direction, wherein
the first output optical system includes an optical sensor, and
the first input optical system includes a beam adjuster that is controlled based on an output from the optical sensor.

3. A laser apparatus comprising:
a first chamber configured to allow passage of a pulse laser beam generated by an external device and cause the pulse laser beam to exit in a first direction;
a third chamber configured to allow passage of a pulse laser beam having exited from the first chamber and cause the pulse laser beam to exit in the first direction;
a first optical system configured to cause a pulse laser beam having exited from the third chamber to exit in a second direction that is different from the first direction;
a second optical system configured to cause a pulse laser beam having exited from the first optical system to exit in a third direction that is substantially opposite to the first direction and is different from the second direction;
a fourth chamber configured to allow passage of a pulse laser beam having exited from the second optical system and cause the pulse laser beam to exit in the third direction; and
a second chamber configured to allow passage of a pulse laser beam having exited from the fourth chamber and cause the pulse laser beam to exit in the third direction.

4. The laser apparatus according to claim 3, wherein at least three of the first to fourth chambers are configured to amplify the respective pulse laser beams and allow passage of the respective pulse laser beams.

5. The laser apparatus according to claim 3, further comprising:
a first frame to which the first chamber and the second chamber are positioned;
a second frame to which the third chamber and the fourth chamber are positioned, the second frame being configured to be separable from the first frame; and
a fixing mechanism configured to fix the first frame and the second frame to each other.

6. The laser apparatus according to claim 5, further comprising a damper configured to elastically support the first frame and the second frame fixed to each other by the fixing mechanism.

7. A method for adding a third chamber and a fourth chamber to a laser apparatus,
the laser apparatus including (A1) a first chamber configured to allow passage of a pulse laser beam generated by an external device and cause the pulse laser beam to exit in a first direction, (A2) a first optical system configured to cause a pulse laser beam having exited from the first chamber to exit in a second direction that is different from the first direction, (A3) a second optical system configured to cause a pulse laser beam having exited from the first optical system to exit in a third direction that is substantially opposite to the first direction and is different from the second direction, and (A4) a second chamber configured to allow passage of a pulse laser beam having exited from the second optical system and cause the pulse laser beam to exit in the third direction,
the method comprising:
(A) changing the first optical system of the laser apparatus so that the first optical system becomes an optical system configured to cause the pulse laser beam having exited from the first chamber to exit in the first direction;
(B) adding (B1) the third chamber configured to allow passage of a pulse laser beam having exited from the first optical system and cause the pulse laser beam to exit in the first direction, (B2) a third optical system configured to cause a pulse laser beam having exited from the third chamber to exit in the second direction, (B3) a fourth optical system configured to cause a pulse laser beam having exited from the third optical system to exit in the third direction, and (B4) the fourth chamber configured to allow passage of a pulse laser beam having exited from the fourth optical system and cause the pulse laser beam to exit in the third direction; and
(C) changing the second optical system of the laser apparatus so that the second optical system becomes an optical system configured to cause a pulse laser beam having exited from the fourth chamber to exit in the third direction toward the second chamber.

8. The method according to claim 7, wherein at least three of the first to fourth chambers are configured to amplify the respective pulse laser beams and allow passage of the respective pulse laser beams.

9. The method according to claim 7, wherein
the first optical system includes a first mirror configured to cause the pulse laser beam having exited from the first chamber to exit in the second direction,
the second optical system includes a second mirror configured to cause the pulse laser beam having exited from the first optical system to exit in the third direction, and
(A) changing the first optical system and (C) changing the second optical system include removing the first mirror and the second mirror from an optical path of a pulse laser beam between the first chamber and the second chamber.

10. The method according to claim 9, wherein
the third optical system includes a third mirror configured to cause the pulse laser beam having exited from the third chamber to exit in the second direction,
the fourth optical system includes a fourth mirror configured to cause the pulse laser beam having exited from the third optical system to exit in the third direction, and
at least one of the first mirror and the second mirror is reused as at least one of the third mirror and the fourth mirror.

11. A laser apparatus comprising:
an amplifier including a plurality of first electrical connection terminals;
a power supply device including a plurality of second electrical connection terminals and configured to supply electric power to the amplifier; and a frame in which the amplifier and the power supply device are placed, the frame including:

a positioning mechanism configured to position the amplifier and the power supply device so that the amplifier is placed in a first position in the frame and the power supply device is placed in a second position in the frame;

a plurality of third electrical connection terminals arranged to make contact with the plurality of first electrical connection terminals, respectively, when the amplifier is placed in the first position;

a plurality of fourth electrical connection terminals arranged to make contact with the plurality of second electrical connection terminals, respectively, when the power supply device is placed in the second position; and a plurality of conductive members configured to be electrically connected to the plurality of third electrical connection terminals, respectively, and to the plurality of fourth electrical connection terminals, respectively.

12. The laser apparatus according to claim 11, further comprising a moving mechanism configured to move the amplifier in a direction crossing a direction of gravitational force, wherein the plurality of first electrical connection terminals are located on a side surface of the amplifier.

13. The laser apparatus according to claim 11, further comprising an elevating mechanism configured to move the amplifier up and down, wherein the plurality of first electrical connection terminals are located on a bottom surface of the amplifier.

14. A laser apparatus comprising:

an amplifier including a plurality of first electrical connection terminals;

a power supply device including a plurality of second electrical connection terminals and configured to supply electric power to the amplifier;

a frame in which the amplifier and the power supply device are placed, the frame including a positioning mechanism configured to position the amplifier and the power supply device so that the amplifier is placed in a first position in the frame and the power supply device is placed in a second position in the frame; and a connecting member configured to be attached to the amplifier and to the power supply device when the amplifier is placed in the first position and the power supply device is placed in the second position, the connecting member including:

a plurality of third electrical connection terminals configured to make contact with the plurality of first electrical connection terminals, respectively, when the connecting member is attached to the amplifier and the power supply device;

a plurality of fourth electrical connection terminals configured to make contact with the plurality of second electrical connection terminals, respectively, when the connecting member is attached to the amplifier and the power supply device; and a plurality of conductive members configured to be electrically connected to the plurality of third electrical connection terminals, respectively, and to the plurality of fourth electrical connection terminals, respectively.

* * * * *